United States Patent
Shih et al.

(10) Patent No.: US 12,271,859 B2
(45) Date of Patent: Apr. 8, 2025

(54) SYSTEM AND METHOD FOR PROCESSING USING WEIGHT DATA

(71) Applicant: DoorDash, Inc, San Francisco, CA (US)

(72) Inventors: Harrison Shih, San Francisco, CA (US); Hamid Sani, Salt Lake City, UT (US); Levi Lalla, San Mateo, CA (US); Agota Sipos, San Francisco, CA (US); Milind Shah, Fremont, CA (US); Derek Bruce Young, San Francisco, CA (US); Thomas Belluscio, Las Vegas, NV (US)

(73) Assignee: DoorDash, Inc., San Francisco, CA (US)

( * ) Notice: Subject to any disclaimer, the term of this patent is extended or adjusted under 35 U.S.C. 154(b) by 0 days.

(21) Appl. No.: 18/354,213

(22) Filed: Jul. 18, 2023

(65) Prior Publication Data
US 2024/0070601 A1    Feb. 29, 2024

Related U.S. Application Data

(60) Provisional application No. 63/401,024, filed on Aug. 25, 2022.

(51) Int. Cl.
*G06Q 10/0834*    (2023.01)
*G01G 19/414*    (2006.01)

(52) U.S. Cl.
CPC ....... *G06Q 10/0834* (2013.01); *G01G 19/414* (2013.01)

(58) Field of Classification Search
CPC . G06Q 10/0834; G01G 19/414; G01G 19/005
See application file for complete search history.

(56) References Cited

U.S. PATENT DOCUMENTS

| 6,384,850 B1 | 5/2002 | McNally et al. |
| 6,871,325 B1 | 3/2005 | McNally et al. |

(Continued)

FOREIGN PATENT DOCUMENTS

| KR | 101754403 B1 * | 7/2017 |
| KR | 20210047660 A * | 4/2021 |

(Continued)

OTHER PUBLICATIONS

Goode, Loren, "Review: Amazon Dash Smart Shelf", https://www.wired.com/review/amazon-dash-smart-shelf/, Mar. 8, 2021 (Year: 2021).*

(Continued)

*Primary Examiner* — George Chen
*Assistant Examiner* — Stephanie S. Wallick
(74) *Attorney, Agent, or Firm* — Kilpatrick Townsend & Stockton LLP

(57) ABSTRACT

A method includes a computer receiving a fulfillment request associated with one or more items. Responsive to receiving the fulfillment request, the computer determines estimated weight data based on the one or more items in the fulfillment request. The computer obtains actual weight data associated with the fulfillment request for one or more items. The computer verifies that the actual weight data corresponds to the estimated weight data. The computer performs additional processing based on verifying.

20 Claims, 14 Drawing Sheets

(56) References Cited

U.S. PATENT DOCUMENTS

| | | | |
|---|---|---|---|
| 6,982,733 B1 | 1/2006 | McNally et al. | |
| 8,146,077 B2 | 3/2012 | McNally et al. | |
| 9,009,060 B2 | 4/2015 | McNally | |
| 9,453,758 B2* | 9/2016 | Motoyama | G06Q 20/208 |
| 9,747,651 B2 | 8/2017 | McNally | |
| 10,970,797 B2 | 4/2021 | McNally | |
| 11,017,350 B1* | 5/2021 | De Bonet | G01G 19/42 |
| 11,107,023 B2* | 8/2021 | Glasgow | G06Q 10/06315 |
| 11,276,130 B2 | 3/2022 | McNally | |
| 11,842,415 B2 | 12/2023 | McNally | |
| 11,847,587 B1 | 12/2023 | McNally | |
| 2008/0217108 A1* | 9/2008 | Curt | G06Q 20/208 186/61 |
| 2013/0284806 A1* | 10/2013 | Margalit | G07G 1/0009 235/382 |
| 2014/0249937 A1 | 9/2014 | McNally | |
| 2019/0049988 A1* | 2/2019 | Meij | G06Q 10/08 |
| 2019/0304238 A1* | 10/2019 | Ambauen | G06Q 20/40145 |
| 2020/0160428 A1* | 5/2020 | Calvo | G06Q 30/0633 |
| 2020/0286021 A1* | 9/2020 | Luckay | G06Q 10/08355 |
| 2021/0174294 A1* | 6/2021 | Warmoth | G06Q 30/0639 |
| 2022/0222621 A1* | 7/2022 | Kanata | G06Q 10/0832 |
| 2022/0351128 A1* | 11/2022 | Hameed | G06Q 10/0832 |

FOREIGN PATENT DOCUMENTS

| | | |
|---|---|---|
| KR | 102430959 B1 * | 8/2022 |
| WO | 0122289 A1 | 3/2001 |

OTHER PUBLICATIONS

Application No. PCT/US2023/070863, International Search Report and Written Opinion, Mailed On Nov. 20, 2023, 9 pages.

"Civil Action No. 2:23-CV-2165-WSH", Amended Complaint for Patent Infringement—*Ameranth, Inc.*, Plaintiff, V. *Doordash, Inc., Eat'n Park Restaurants, LLC, and Eat'n Park Hospitality Group, Inc.*, Defendants, Sep. 17, 2024, pp. 1-91.

U.S. Appl. No. 18/145,942, "Unpublished U.S. Patent Application No.", Dec. 23, 2022.

* cited by examiner

SYSTEM AND METHOD FOR PROCESSING USING WEIGHT DATA

CROSS-REFERENCES TO RELATED APPLICATIONS

This application is a non-provisional application of and claims the benefit of the filing date of U.S. Provisional Application No. 63/401,024, filed on Aug. 25, 2022, which is herein incorporated by reference.

SUMMARY

A method according to embodiments includes receiving, by a computer, a fulfillment request associated with one or more items; responsive to receiving the fulfillment request, determining, by the computer, estimated weight data based on the one or more items in the fulfillment request; obtaining, by the computer, actual weight data associated with the fulfillment request for one or more items; verifying, by the computer, that the actual weight data corresponds to the estimated weight data; and performing, by the computer, additional processing based on verifying.

Other embodiments include a computer comprising: a processor; and a computer readable medium comprising code, executable by the processor, to perform a method comprising: receiving a fulfillment request associated with one or more items; responsive to receiving the fulfillment request, determining estimated weight data based on the one or more items in the fulfillment request; obtaining actual weight data associated with the fulfillment request for one or more items; verifying that the actual weight data corresponds to the estimated weight data; and performing additional processing based on verifying.

Another embodiment includes a system comprising: a scale; and a computer coupled to the scale, the computer comprising a processor, and a computer readable medium comprising code, executable by the processor, to perform a method comprising receiving a fulfillment request associated with one or more items; responsive to receiving the fulfillment request, determining estimated weight data based on the one or more items in the fulfillment request; obtaining actual weight data associated with the fulfillment request for one or more items; verifying that the actual weight data corresponds to the estimated weight data; and performing additional processing based on verifying.

A better understanding of the nature and advantages of embodiments of the invention may be gained with reference to the following detailed description and accompanying drawings.

DETAILED DESCRIPTION

Figure 1:
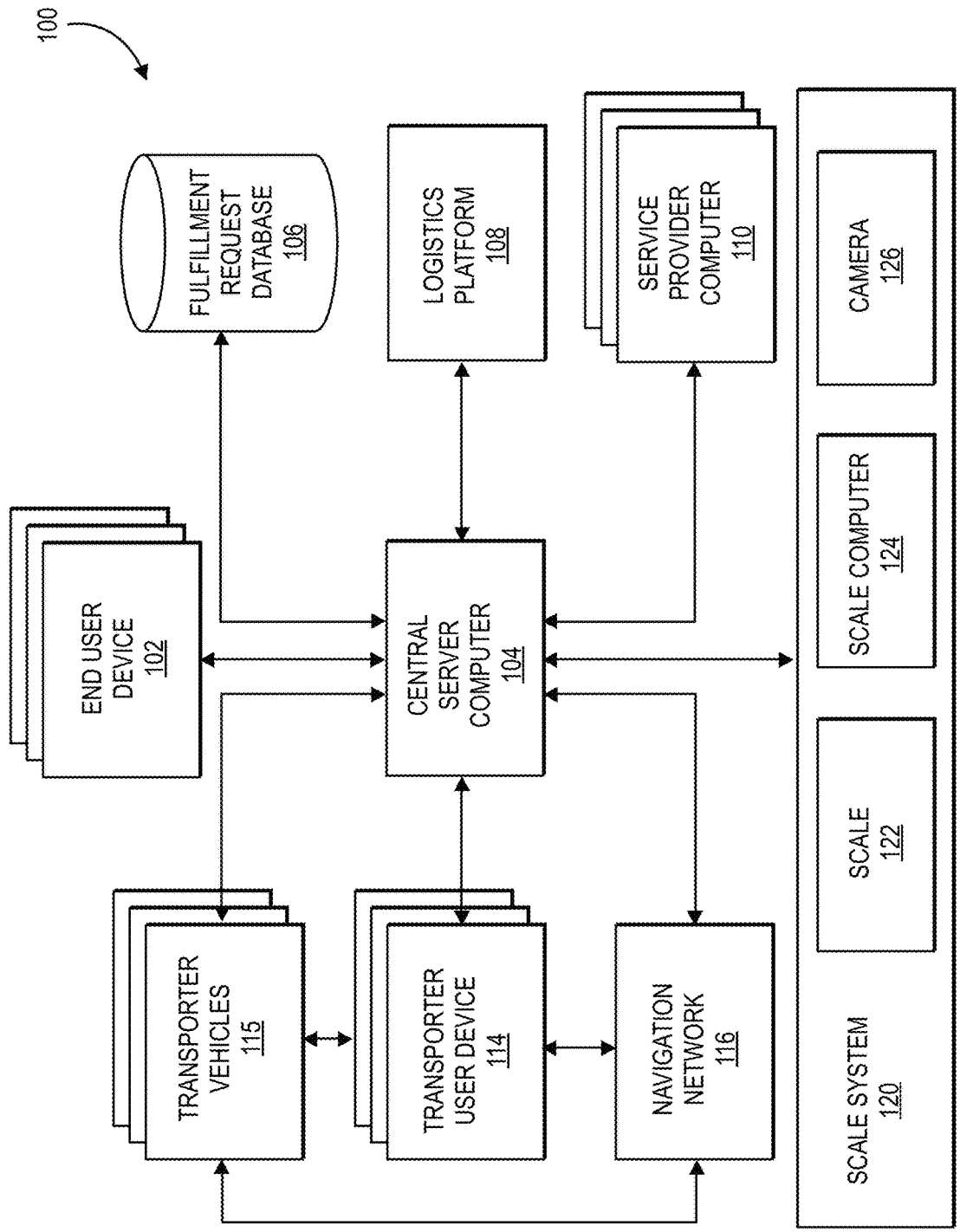
FIG. 1 shows a block diagram illustrating a processing system according to embodiments.

Prior to discussing embodiments of the disclosure, some terms can be described in further detail.

A "user" may include an individual or a computational device. In some embodiments, a user may be associated with one or more personal accounts and/or mobile devices. In some embodiments, the user may be a cardholder, account holder, or consumer.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device (e.g., a mobile phone), a laptop or desktop computer, a wearable device (e.g., smartwatch), etc.

A "fulfillment request" or "fulfillment request message" can be a request to provide a resource in response to a request. For example, a fulfillment request can include an initial communication from an end user device to a central server computer for a first service provider computer to fulfill a purchase request for a resource such as food. A fulfillment request can be in an initial state, a partially completed state, or a final state. After the fulfillment request is in a final state, it can be accepted by the central server computer, and the central server computer can send a fulfillment request confirmation to the end user device. An exemplary fulfillment request can include a list of items to be purchased in an order, the quantity of each item to be purchased, an end user identifier for the user that initiates the fulfillment request, a total amount of the fulfillment request, and a timestamp associated with the fulfillment request.

A "transporter" can be an entity that transports something. A transporter can be a person that transports a resource using a transportation device (e.g., a car). In other embodiments, a transporter can be a transportation device that may or may not be operated by a human. Examples of transportation devices include cars, boats, scooters, bicycles, drones, airplanes, etc. A transporter may also use a user device (e.g., a driver using a mobile phone) or a user device be in coupled to the transporter (e.g., a telecommunications unit in an autonomous vehicle).

An "item" can include an individual article or unit. An item can be a thing that is provided by a service provider. Items can be a goods. For example, an item can be a bowl of soup, a soda can, a toy, clothing, etc. An item can be a thing that is delivered from a service provider location to an end user location by a transporter.

"Weight data" can include digital information regarding a unit or system of units used for expressing how much an object or quantity of matter weighs. Weight data can include data relating to a weight or a mass of an object. Weight data can include either actual weight data or estimated weight data.

"Actual weight data" can include information of a measured amount of weight. A scale can determine actual weight data for loads placed on the scale. For example, a load that includes a closed container that includes four food items can be placed on a scale. The scale can determine actual weight data for the load (e.g., 500 grams).

"Estimated weight data" can include information of a calculated amount of weight. Estimated weight data can be generated by a computer based on previous weight data. Estimated weight data can be a prediction of what the actual weight data will be when one or more items are weighed on a scale. The estimated weight data can be compared to the actual weight data to determine if the correct items were weighted. For example, a computer can determine estimated weight data for a load that includes a closed container that includes four food items with known typical weights. The computer can determine the estimated weight based on the typical weights.

The term "artificial intelligence model" or "AI model" can include a model that may be used to predict outcomes in order achieve a pre-defined goal. The AI model may be developed using a learning algorithm, in which training data is classified based on known or inferred patterns. An AI model may also be referred to as a "machine learning model" or "predictive model."

"Machine learning" can include an artificial intelligence process in which software applications may be trained to make accurate predictions through learning. The predictions can be generated by applying input data to a predictive model formed from performing statistical analyses on aggregated data. A model can be trained using training data, such that the model may be used to make accurate predictions. The prediction can be, for example, a classification of an image (e.g., identifying images of cats on the Internet) or as another example, a recommendation (e.g., a movie that a user may like or a restaurant that an end user might enjoy).

In some embodiments, a model may be a statistical model, which can be used to predict unknown information from known information. For example, the machine learning model can be associated with a learning module may be a set of instructions for generating a regression line from training data (supervised learning) or a set of instructions for grouping data into clusters of different classifications of data based on similarity, connectivity, and/or distance between data points (unsupervised learning). The regression line or data clusters can then be used as a model for predicting unknown information from known information. Once the model has been built from the learning module, the model may be used to generate a predicted output from a new request. A new request may be a request for a prediction associated with presented data. For example, a new request may be a request for classifying an image or for creating a recommendation for a user.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on feature vectors or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, collections of artificial "neurons" that perform functions by activating in response to inputs.

A "feature" can be an individual measurable property or characteristic of a phenomenon. A feature can be described by a feature vector. A feature can be input into a model to determine an output. As an example, in pattern recognition and machine learning, a feature vector is an n-dimensional vector of numerical features that represent some object. Algorithms in machine learning require a numerical representation of objects since such representations facilitate processing and statistical analysis. When representing images, the feature values might correspond to the pixels of an image. When representing text, however, the features might be the frequencies of occurrence of textual terms. Feature vectors are equivalent to the vectors of explanatory variables used in statistical procedures such as linear regression. Feature vectors can be combined with weights using a dot product in order to construct a linear predictor function that is used to determine a score for making a prediction.

A "server computer" is typically a powerful computer or cluster of computers. For example, the server computer can be a large mainframe, a minicomputer cluster, or a group of servers functioning as a unit. In one example, the server computer may be a database server coupled to a Web server. A server computer can also include a cloud computer.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An end user using an end user device can provide a fulfillment request for one or more items (e.g., food) to a service provider (e.g., a restaurant) that operates a service provider computer via a central server computer. The central server computer can be operated by a third party (e.g., a delivery company) that coordinates the processing of the fulfillment request. The central server computer can create an order based on the data relating to the fulfillment request and can send the order to the service provider computer. The service provider, upon receiving the order, can prepare the one or more items. When the one or more items are ready, the service provider computer can inform the central server computer that they are ready. The central server computer can then facilitate the delivery of the one or more items from the service provider to the user by using a transporter (e.g., a delivery driver or autonomous vehicle).

There are several problems associated with the processing of the fulfillment request. One problem is that the service provider may not provide the correct items in the order. For example, wrong items may be provided in the order, items may be inadvertently omitted, items may be prepared in the incorrect manner, etc. Another problem is that, in some cases, the service provider does not notify the transporter when the order is ready. The transporter may arrive too early or too late after the items in the order have been prepared. The transporter can only rely on estimated preparation time of the order. For example, a central server computer can give an estimate of 20 minutes for a restaurant to prepare a food order. However, the restaurant may actually take 30 minutes to prepare the food order. This causes the transporter to wait for 10 minutes. This can waste the transporter's time. If the transporter is late, then the quality of the items in the order may degrade if the transporter does not pick up the order and promptly deliver it to the end user once the items in the order have been prepared by the service provider.

Yet another problem is that there is no easy way to determine if claims for incorrect orders by end users or claims of correct orders by service providers are valid. This is because the actual evidence pertaining to the preparation and completion of the items in an order does not exist once the order has been delivered to the end user.

Furthermore, items can be packaged in a closed container for delivery for privacy, food safety, etc. Transporters cannot check inside the closed container to validate the correctness of the order.

Embodiments can address these and other problems by introducing a scale system that can detect a weight of items in an order. The scale system can be at a service provider and can be in communication with a service provider computer. In embodiments, a central server computer may receive a fulfillment request for an order comprising one or more items from a user device. The central server computer can create an order based on the data relating to the fulfillment request (e.g., item information, estimated weights of the item, etc.), assigns a fulfillment request identifier to the order, and send the order and the fulfillment request identifier to the service provider computer. The service provider, upon receiving the order, can then prepare the one or more items. When the order is ready, the service provider can place the order comprising the one or more items on the scale in the scale system.

The scale system can measure the weight of the one or more items in the order, and the actual weight data and the fulfillment request identifier (e.g., an order number) may be transmitted to the service provider computer, and then to the central server computer (or directly to the central server computer). The central server computer can have estimated weight data of the matching order in its database, and the central server computer can compare the estimated weight data of the order to the actual weight data. If the difference between the actual weight data and the estimated weight data exceeds a threshold, then then the central server computer transmits a message that there is a discrepancy in the order back to the service provider computer. The service provider can then check the items in the order and can make any necessary corrections. In some embodiments, the central server computer can provide the estimated weight data to the scale system, where the scale system performs the comparison locally.

In the case where the actual weight of the order is substantially the same as the estimated weight, then the central server computer can use this as a signal that the order is ready to be picked up and can notify the transporters in the vicinity of the service provider that the order is ready.

The actual weight data of the order may be stored by the central server computer for later use. For example, if an end user makes a fraudulent claim with the central server computer regarding the order (e.g., the order did not have a particular ordered item), then the actual weight data can be used by the central server computer to prove that the order was complete when it was obtained by the transporter from the service provider, and delivered to the end user.

The scale system can be a smart scale that measures weights of one or more items to process the matching order. In some embodiments, the scale system can be in the form of a smart shelf that uses a scale to measure weights of orders. Also, in some embodiments, a camera can be used to capture image data of orders or items on the shelf or scale. The smart shelf can use both the weight data and the image data to process orders of items. For example, a smart shelf may have three orders with items on it, and the camera may recognize the three orders and can recognize the orders via barcodes, QR codes, fulfillment request identifiers, or the like. The central server computer can use the image data to determine the three orders, and can use the weight data from the scale system to determine if the total weight of the three orders is substantially equal to the estimated weight of the three orders.

FIG. 1 shows a system 100 according to embodiments of the disclosure. The system 100 comprises one or more end user devices 102, a central server computer 104, a fulfillment request database 106, a logistics platform 108, one or more service provider computers 110, one or more transporter user devices 114, one or more transporter vehicles 115, a navigation network 116, and a scale system 120 comprising a scale 122, a scale computer 124, and a camera 126.

The central server computer 104 can be in operative communication with the one or more end user devices 102, the fulfillment request database 106, the logistics platform 108, the one or more service provider computers 110, the transporter user device 114, the transporter vehicles 115, the scale system 120, and in some embodiments, the navigation network 116. Further, the one or more transporter user devices 114 can be in operative communication with the navigation network 116. In some embodiments, the transporter vehicles 115 can be in operative communication with the navigation network 116.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. For example, one or more scale systems 120 can be present in the system 100. In some embodiments, there may be a different scale system located at each service provider computer location.

Messages between at least the devices in FIG. 1 can be transmitted using a secure communications protocols such as, but not limited to, File Transfer Protocol (FTP); Hyper-Text Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The one or more end user devices 102 includes devices operated by end users. The one or more end user devices 102 can generate and provide fulfillment request messages to the central server computer 104. The fulfillment request message can indicate that the request (e.g., a request for a service) can be fulfilled by one or more service provider computers 110. For example, the fulfillment request message can be generated based on a cart selected at checkout during a transaction using a central server computer application installed on the end user device 102. The fulfillment request message can include one or more items from the selected cart.

For example, the fulfillment request message can be a request for a food item (e.g., a hamburger) to be prepared by a specific service provider computer 110 and delivered to an end user location by a transporter that operates a transporter user device and, in some embodiments, a transporter vehicle.

The central server computer 104 includes a server computer that can facilitate in the fulfillment of fulfillment requests received from the one or more end user devices 102. For example, the central server computer 104 can identify one or more transporters operating one or more transporter user devices 114 that are capable of satisfying the fulfillment request. The central server computer 104 can identify the transporters and transporter user devices 114 that can satisfy the fulfillment request based on any suitable criteria (e.g., transporter location, service provider location, end user destination, end user location, transporter mode of transportation, etc.). The logistics platform 108 may provide real time data regarding locations of the various service providers, transporters, and end users to the central server computer 104.

The fulfillment request database 106 can store data related to previous (e.g., historical) fulfillment requests. For example, after a fulfillment request is fulfilled, the central server computer 104 can store fulfillment request data in the fulfillment request database 106. For example, the central server computer 104 can store any spatial-temporal fulfillment data (e.g., transporter user device location over time, transporter user device motion data over time, length of time taken to fulfil the fulfillment request, a fulfillment time, a fulfillment location, etc.), fulfillment service data (e.g., fulfilled services, an amount, a service provider computer identifier, an end user device identifier, a transporter user device identifier, etc.), and any other data relating to the fulfillment request and/or the fulfillment of the fulfillment request.

The one or more service provider computers 110 include computers operated by service providers. For example, a service provider computer can be a food provider computer that is operated by a food provider. The one or more service provider computers 110 can offer to provide services to the end users of the one or more end user devices 102. The service provider computer 110 can receive requests to prepare one or more items for delivery from the central server computer 104. The service provider computer 110 can initiate the preparation of the one or more items that are to be delivered to the end user of the end user device 102 by a transporter of a transporter user device 114.

The one or more transporter user devices 114 can be devices operated by transporters. The one or more transporter user devices 114 can be smartphones, wearable devices, personal assistant devices, etc. A transporter using a transporter user device 114 can provide a request to fulfill an end user's fulfillment request. For example, the transporter user device 114 can generate and transmit a request to fulfill a particular end user's fulfillment request to the central server computer 104. The central server computer 104 can notify the transporter user device 114 of the fulfillment request. The transporter user device 114 can respond to the central server computer 104 with a request to perform the delivery to the end user as indicated by the fulfillment request. In some embodiments, the one or more transporter user devices 114 are communication devices in autonomous vehicles.

In some embodiments, a transporter can operate a transporter user device 114 and a transporter vehicle 115. For example, a transporter can be a delivery person, the transporter user device 114 can be the delivery person's mobile phone, and the transporter vehicle 115 can be a car that is operated by the delivery person. The transporter vehicles 115 can include cars, bikes, mopeds, skateboards, public transit vehicles, etc. In some embodiments, a transporter may not utilize a transporter vehicle 115 (e.g., the transporter can deliver the items of the fulfillment request by foot).

In some embodiments, the central server computer 104 can identify the transporter vehicle 115 that can satisfy the fulfillment request based on any suitable criteria (e.g., transporter vehicle location, transporter vehicle type, transporter vehicle battery charge level, transporter vehicle weight limit, service provider location, end user destination, end user location, etc.). The transporter vehicles 115 can include autonomous vehicles that can operate without receiving input from transporters.

The navigation network 116 can provide navigational directions to the one or more transporter user devices 114. For example, the transporter user device 114 can obtain a location from the central server computer 104. The location can be a service provider parking location, a service provider location, an end user parking location, an end user location, etc. The navigation network 116 can provide navigational data to the location. For example, the navigation network 116 can be a global positioning system that provides location data to the transporter user device 114. In some embodiments, the transporter vehicle 115, which can be an autonomous vehicle, can communicate with the navigation network 116 to direct the transporter vehicle 115 to the destination.

The scale system 120 can include a scale 122, a scale computer 124, and a camera 126. The scale system 120 can include physical and electrical components that determine weights of items. The scale system 120 can determine actual weights of items placed on the scale at a service provider location. In particular, the scale 122 can determine the actual weight of the items. In some embodiments, the scale system 120 can be a smart shelf, which includes a shelf with scales on and/or in the shelf.

In some embodiments, the scale computer 124 can transmit and receive messages to and from the central server computer 104. For example, the central server computer 104 can provide fulfillment request messages, or derivatives thereof, to the scale system 120. In some embodiments, the scale computer 124 can determine estimated weights for the items that are indicated in the fulfillment request message. In other embodiments, the central server computer 104 can determine the estimated weights for the items in the fulfillment request message, and provide the estimated weight to the scale system 120.

The scale system 120 can verify that the actual weight data corresponds to the estimated weight data. The scale system 120 can then perform additional processing based on verifying. For example, the scale system 120 can generate and provide a notification to the central server computer 104 that the one or more items are completed and are ready to deliver to the end user. As another example, the scale system 120 can include a camera and can receive image data of the one or more items in the fulfillment request. The scale system 120 can utilize the image data for the additional processing. As another example, the additional processing can include determining if the fulfillment request of the one or more items provided by the service provider is erroneous or fraudulent based on the estimated weight and/or the actual weight.

The camera 126 can be coupled to the scale 122 and/or the scale computer 124 via an electro mechanical connection. The camera 126 can be a device for recording visual images. The camera 126 can face the scale (e.g., the aperture of the camera 126 points towards the scale 122) to record images or video of item(s) on the scale 122. For example, the camera 126 can record images of a closed container that includes two items being placed on the scale 122. The images captured by the camera 126 can be evaluated by software configured to recognize objects in the image (e.g., performed by the scale computer 124). The captured images can include barcodes, QR codes, fulfillment request identifiers printed or written on the containers, etc. The camera 126 can output images to the scale computer 124, which can evaluate the images to determine containers to which the images correspond.

Figure 2:
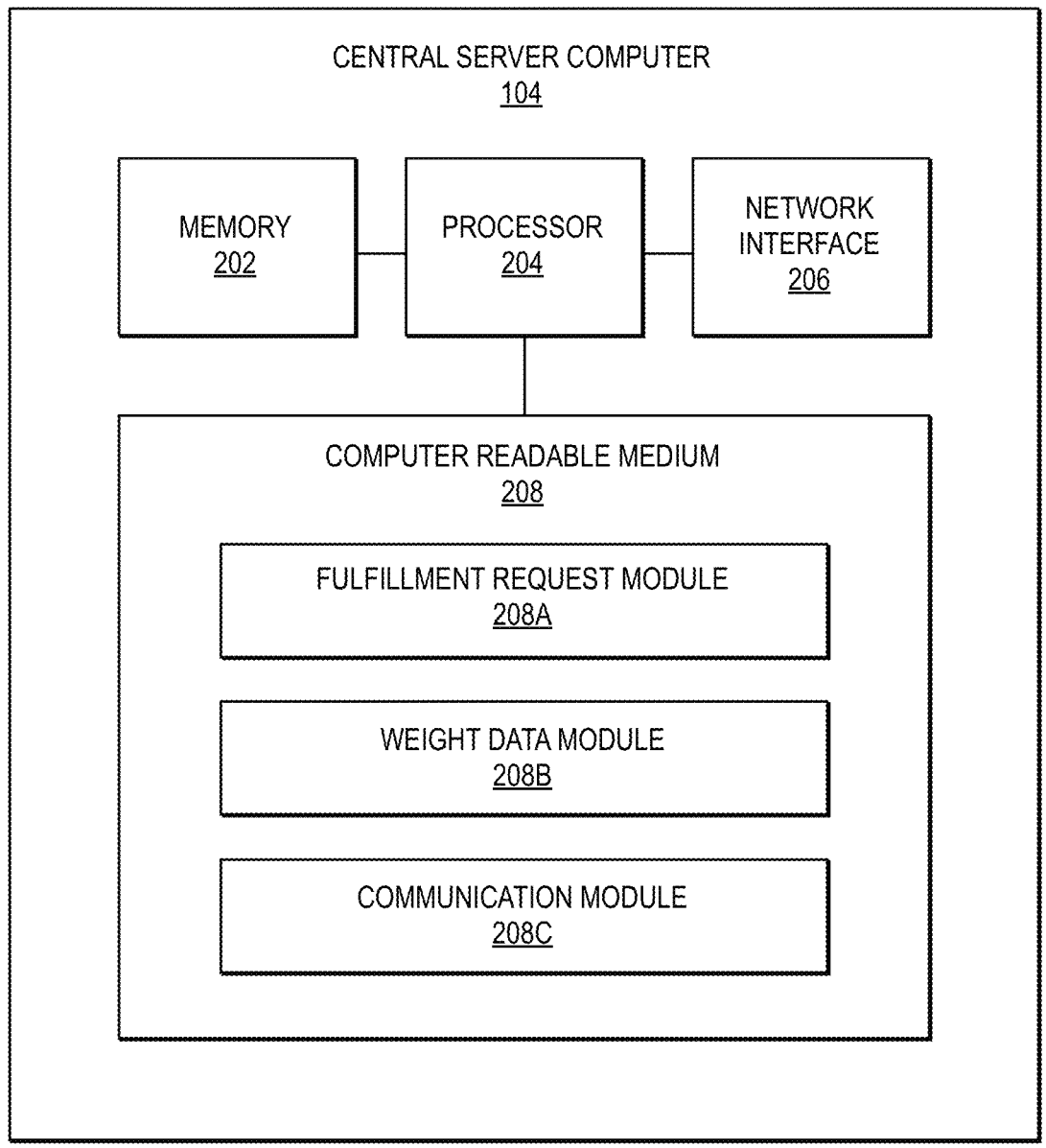
FIG. 2 shows a block diagram of a central server computer according to embodiments.

FIG. 2 shows a block diagram of a central server computer 104 according to embodiments. The exemplary central server computer 104 may comprise a processor 204. The processor 204 may be coupled to a memory 202, a network interface 206, and a computer readable medium 208. The computer readable medium 208 can comprise a fulfillment request module 208A, a weight data module 208B, and a communication module 208C.

The memory 202 can be used to store data and code. For example, the memory 202 can store fulfillment requests, weight data, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: receiving a fulfillment request associated with one or more items; responsive to receiving the fulfillment request, determining estimated weight data based on the one or more items in the fulfillment request; obtaining actual weight data associated with the fulfillment request for one or more items; verifying that the actual weight data corresponds to the estimated weight data; and performing additional processing based on verifying.

The fulfillment request module 208A may comprise code or software, executable by the processor 204, for processing a fulfillment request. The fulfillment request module 208A, in conjunction with the processor 204, can receive fulfillment request messages from end user devices 102. The fulfillment request messages can include a selected service provider, one or more selected items, and a delivery location. The fulfillment request module 208A, in conjunction with the processor 204, can generate a fulfillment request identifier for the fulfillment request message, and in some embodiments, can modify the fulfillment request message to include the fulfillment request identifier. The fulfillment request module 208A, in conjunction with the processor 204, can operate with the weight data module 208B to obtain estimated weight data for the one or more selected items. The fulfillment request module 208A, in conjunction with the processor 204, can modify the fulfillment request message to include the estimated weight data.

The fulfillment request module 208A, in conjunction with the processor 204, can determine one or more transporters operating one or more transporter user devices that are capable of fulfilling the fulfillment request message. The fulfillment request module 208A, in conjunction with the processor 204, can determine the one or more transporters from the transporter user devices. The fulfillment request module 208A, in conjunction with the processor 204, can determine the one or more transporter user devices based on whether or not a transporter user device is online, whether or not the transporter associated with the transporter user device is already fulfilling a different fulfillment request message, a location of the transporter user device, etc. The fulfillment request module 208A, in conjunction with the processor 204, can provide the fulfillment request message, or a derivation thereof, to the one or more transporter user devices, where a transporter operating a transporter user device can accept the delivery of the order.

The fulfillment request module 208A, in conjunction with the processor 204, can also provide the fulfillment request message, or derivation thereof, to the service provider computer 106, so that the service provider computer 106 can initiate preparation of the order.

The weight data module 208B can include may comprise code or software, executable by the processor 204, for processing weight data. The weight data module 208B, in conjunction with the processor 204, can generate estimated weight data for the one or more selected items of the fulfillment request message. For example, the fulfillment request message can include a request for two hamburgers and one order of fries. The weight data module 208B, in conjunction with the processor 204, can determine estimated weight data using a database of historical weight data. For The weight data module 208B, in conjunction with the processor 204, can determine that average weight of a hamburger is 300 grams and that the average weight of the order of fries is 200 grams. The weight data module 208B, in conjunction with the processor 204, can determine an estimated weight data for the fulfillment request to be 800 grams. In some embodiments, the weight data module 208B, in conjunction with the processor 204, can take container weight and/or other additional weights into account. For example, the weight data module 208B, in conjunction with the processor 204, can determine the estimated weight data for the fulfillment request to be 900 grams since there most likely will be approximately 100 grams of container, napkins, sauce packets, etc.

The weight data module 208B, in conjunction with the processor 204, can store the estimated weight data into a database 210 along with the fulfillment request identifier for later reference.

The weight data module 208B, in conjunction with the processor 204, can also receive actual weight data and an fulfillment request identifier from a scale system. The weight data module 208B, in conjunction with the processor 204, can identify the estimated weight data in the database using the fulfillment request identifier. The weight data module 208B, in conjunction with the processor 204, can then compare the actual weight data to the estimated weight data. If the weight data module 208B, in conjunction with the processor 204, determines that the actual weight data matches the estimated weight data (within a predetermined amount of error, such as within 50 grams), then the weight data module 208B, in conjunction with the processor 204, can provide a signal to the central server computer 102 that the order's actual weight matches the order's estimated weight. If the weight data module 208B, in conjunction with the processor 204, determines that the actual weight data does not match the estimated weight data, then the weight data module 208B, in conjunction with the processor 204, can notify the scale system of the discrepancy of weight data.

The communication module 208C can include may comprise code or software, executable by the processor 204, for communicating. The communication module 208C may be configured or programmed to perform some or all of the functionality associated with receiving, sending, and generating electronic messages for transmission through the central server computer 104 to or from any of the entities shown in FIG. 1. When an electronic message is received by the central server computer 104 via the external communication interface 206, it may be passed to the communication module 208C. The communication module 208C may identify and parse the relevant data based on a particular messaging protocol. The communication module 208C may then transmit any received information to an appropriate module within the central server computer 104 (e.g., to the fulfillment request module 208A, to the weight data module 208B, etc.). The communication module 208C may also receive information from one or more of the modules in the central server computer 104 and generate an electronic message in an appropriate data format in conformance with a transmission protocol so that the message may be sent to one or more entities within system 100. The electronic message may then be passed to the network interface 206 for transmission.

The network interface 206 may include an interface that can allow the central server computer 104 to communicate with external computers. The network interface 206 may enable the central server computer 104 to communicate data to and from another device (e.g., the fulfillment request database 106, the logistics platform 108, the one or more service provider computers 110, the one or more transporter user devices 114, the one or more transporter vehicles 115, the a navigation network 116, and the scale system 120, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
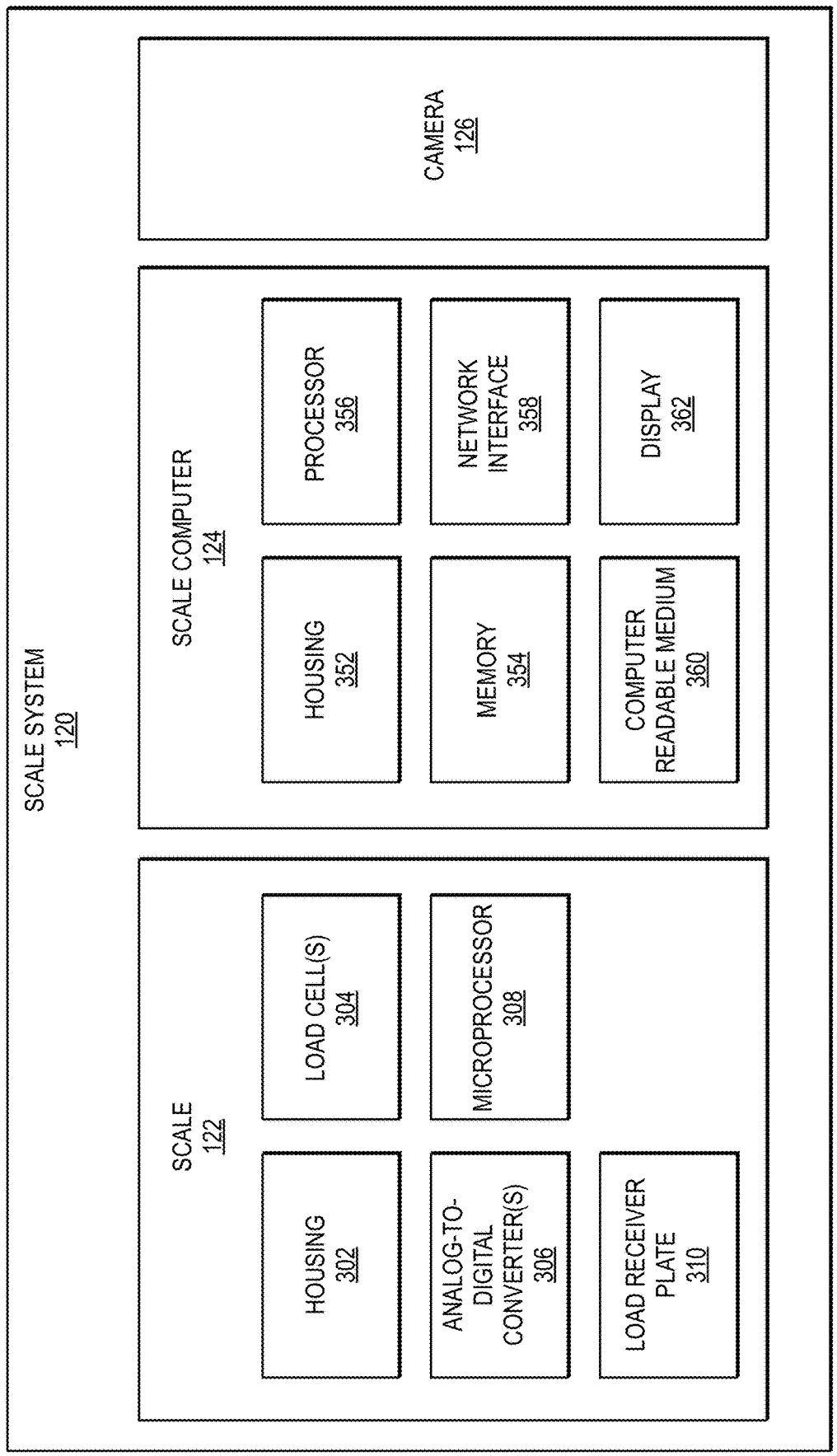
FIG. 3 shows a block diagram of a scale system according to embodiments.

FIG. 3 shows a block diagram of a scale system 120 according to embodiments. The exemplary scale system 120 may comprise a scale 122, a scale computer 124, and a camera 126. Although the scale 122 and the scale computer 124 are shown as separate components, the scale computer 124 can be integrated with the scale 122 in some embodiments.

The scale 122 can include a housing 302, one or more load cells 304, one or more analog-to-digital converters 306, a microprocessor 308, and a load receiver plate. The scale computer 124 can include a housing 352, a processor 356, and a display 362. The processor 356 may be coupled to a memory 354, a network interface 358, and a computer readable medium 360. The computer readable medium 360 can comprise one or more modules that perform functionality. In some embodiments, the scale computer 124 can be powered from an external source (e.g., an outlet) and the scale computer 124 can power the scale 122.

The housing 302 of the scale 122 and the housing 352 of the scale computer 124 can be formed from any material that can provide protection for the other components that are held within the housing. For example, the housing 302 and the housing 352 can be made of plastic, metal, wood, etc. or a combination thereof.

The load receiver plate 310 can be situated on the one or more load cells 304 such that when a load (e.g., one or more items, a container, etc.) is placed on the load receiver plate 310, the added weight to the load receiver plate 310 causes the load receiver plate 310 to put more force on the one or more load cells 304. In some embodiments, the housing 302 of the scale 122 can be integrated into the load receiver plate 310.

The one or more load cells 304 can be force gauges. The one or more load cells 304 can include a transducer that is used to create an electrical signal whose magnitude is in direct proportion with the force being measured. When a load with a weight is placed on to the load receiver plate 310, the one or more load cells 304 can bend slightly, which causes an electrical signal that runs through the load cell to change. This signal change is due to the amount of electrical resistance that the bending causes to the strain gauge inside the load cell.

The one or more load cells 304 can include any suitable type of load cell. For example, the one or more load cells 304 can include pneumatic load cells, hydraulic load cells, strain gauge load cells, and capacitance load cells.

Pneumatic load cells utilize air pressure and consist of an elastic diaphragm, which can be attached to the load receiver plate 310. A pneumatic load cell can also include an air regulator that limits the flow of air pressure and a pressure gauge. Such load cells can work by using pressurized air to balance out the weight of the load, and the amount of air required is therefore used to determine how heavy the load is. The pressure gauge can then convert the reading into an electrical signal.

Hydraulic load cells utilize a fluid such as water or oil. Scales with hydraulic load cells can operate similarly to pneumatic load cells except they use a piston and pressurized liquid rather than air. When a load is placed on the load receiver plate 310, the piston applies increased pressure to the contained liquid which is proportional to the applied weight. After calibrating the pressure, an accurate measure of the weight can be made. The pressure reading can be used as an analogue gauge or be converted to an electric signal.

A strain gauge utilizes electrical resistance. The electrical resistance when under strain is proportional to the strain placed on the cell when weighing a load, which makes it straightforward to calibrate into an accurate measurement. The accuracy can be improved with four strain gauges inside the strain gauge load cell being in a 'Wheatstone Bridge' configuration. This is an electrical circuit that measures unknown electrical resistance and provides very accurate measurements when bent under the weight of an load.

Capacitive load cells work on the ability of the system to store charge. Capacitive load cells consist of two parallel flat plates that have a current applied to them. When the charge is stable, it is then stored between the plates. The amount stored or the capacitance depends on the size of the gap between the plates. So, when a load is placed on the load receiver plate 310, the gap will decrease and create a change in the capacitance, which can then be calculated into weight.

The output electrical signal from the one or more load cells 304 can be input into the one or more analog-to-digital converters 306. The analog-to-digital converters 306 can convert output voltage from the one or more load cells 304 to digital signals for processing by the microprocessor 308. Any suitable analog-to-digital converter can be utilized.

The microprocessor 308 can convert the received digital signals to weight data as known to one of skill in the art. The microprocessor 308 can then output any recorded weight data to the scale computer 124.

The scale computer 124 can process the weight data received from the scale 122 and output the weight data to the display 362. The display 362 can be a screen (e.g., LCD display, LED display, etc.) that is capable of presenting information to a user of the scale system 120.

The processor 356, the memory 354, the network interface 358, and the computer readable medium 360 can be similar to the processor 204, the memory 202, the network interface 206, and the computer readable medium 208, respectively, and will not be repeated here.

The camera 126 can include a device capable of obtaining digital representation of images. The camera 126 can record images of the scale 122 and any loads placed on the load receiver plate 310. Images obtained by the camera 126 can be evaluated to determine what is in the image using one or more machine learning models that are trained to identify objects, writing, etc. in images. The camera 126 can output recorded images to the scale computer 124 for processing.

Loads placed on the load receiver plate 310 can include order identifying information. The camera 126 can capture images of the order identifying information on the load when place on the scale 122. The order identifying information can include an fulfillment request identifier (e.g., order #12345678), a barcode, a QR code, a written description of what the load includes, etc. The order identifying information can be evaluated by the scale computer 124.

Figure 4:
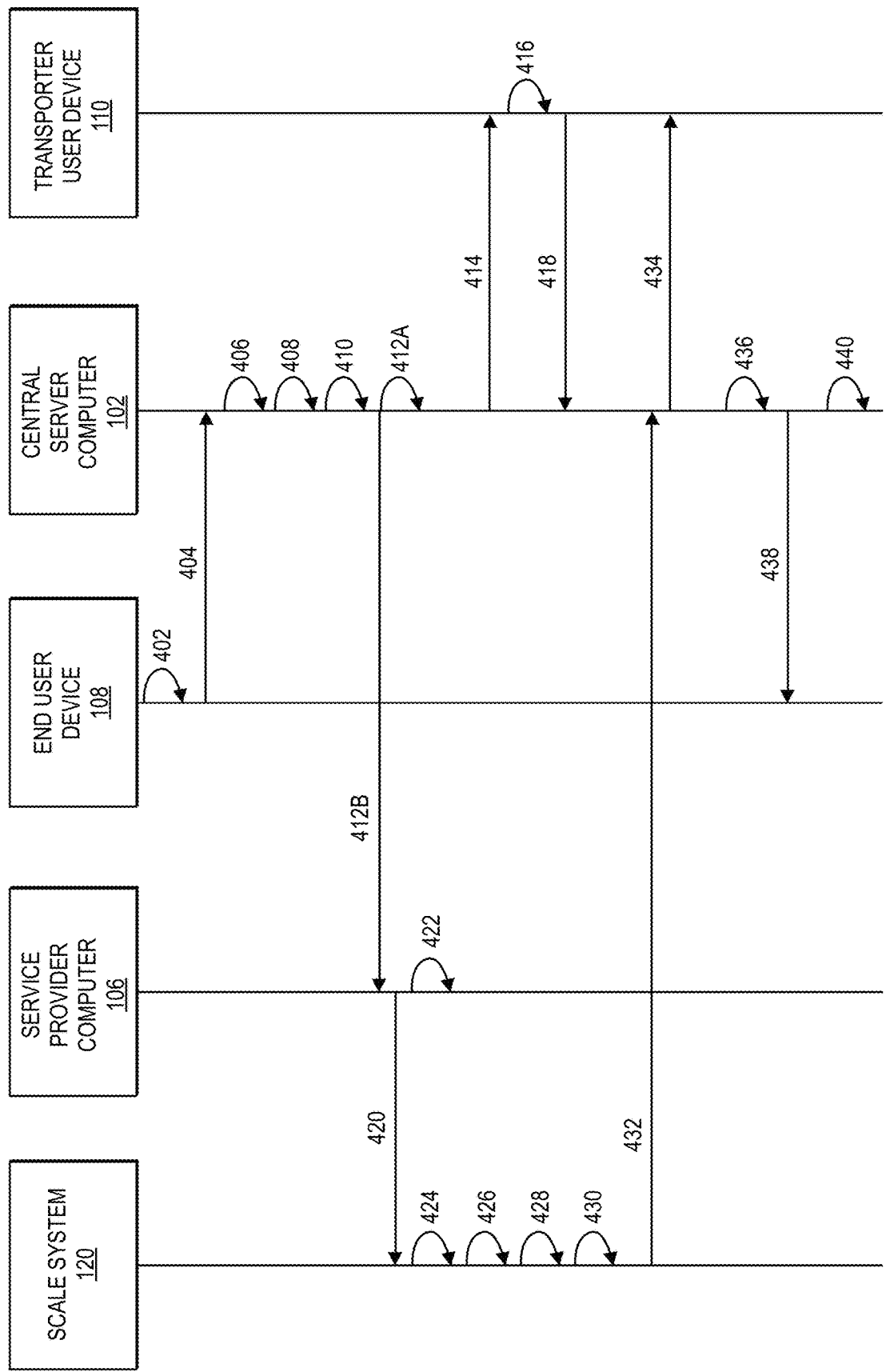
FIG. 4 shows a flow diagram illustrating a preparation and delivery method according to embodiments.

FIG. 4 shows a flow diagram illustrating a preparation and delivery method according to embodiments. The method illustrated in FIG. 4 will be described in the context of the central server computer 102 receiving a fulfillment request message from the end user device 108 to fulfill preparation and delivery of one or more items from a cart to the end user of the end user device 108. The central server computer 102 can communicate with the service provider computer 106 and the transporter user device 110 to fulfill the fulfillment request.

At step 402, the end user device 108 can decide to check out with a cart in a central server computer application installed on the end user device 108. The cart can include one or more items that are provided from a service provider of the service provider computer 106.

At step 404, after checking out with the cart, the end user device 108 can provide a fulfillment request message including the one or more items from the cart to the central server computer 102. The fulfillment request message can also include a service provider computer identifier that identifies the service provider computer 106. The fulfillment request can also include a delivery location for delivery of the one or more items, as well as other information described above.

As an illustrative example, the fulfillment request message can include selected items of two chicken tacos and one beef taco as well as a selected service provider that provides the aforementioned tacos. The fulfillment request message can also include the end user's selected address for delivery. The fulfillment request message can be a request to purchase the selected items and for the central server computer 102 to facilitate in delivery of the selected items to the delivery location.

At step 406, after receiving the fulfillment request message, the central server computer 102 can perform a transaction process with the end user device 108. For example, the central server computer 102 can communicate with a payment network to process the transaction for the one or more items. The central server computer 102 can receive an indication of whether or not the transaction is authorized. If the transaction is authorized, then the central server computer 102 can proceed with step 408.

At step 408, the central server computer 102 can generate a fulfillment request identifier for the fulfillment request message. The fulfillment request identifier can be a value that uniquely identifies the fulfillment request message and/or the order indicated therein. For example, the fulfillment request identifier can be a numerical value of 12345678. In some embodiments, the central server computer 102 can generate the fulfillment request identifier for the fulfillment request message after receiving fulfillment request message. The central server computer 102 can modify the fulfillment request message to include the fulfillment request identifier.

At step 410, after generating the fulfillment request identifier, the central server computer 102 can generate an estimated weight value for the order. The central server computer 102 can generate the estimated weight value for the order based on the one or more items selected by the end user and included in the fulfillment request message.

The central server computer 102 can generate the estimated weight value based on historical recorded weight data. The central server computer 102 can communicate with a weight value database (not shown) to obtain average weight data for each item of the one or more items included in the fulfillment request message.

As an illustrative example, the central server computer 102 can obtain average weight data for the chicken taco (e.g., 250 grams) and the average weight data for the beef taco (e.g., 300 grams) from the weight value database. The central server computer 102 can determine the estimated weight data based on the received historical data. For example, the estimated weight data, for the order including the selected items of two chicken tacos and one beef taco, can be 800 grams.

The central server computer 102 can store the estimated weight data into memory or a database in association with the fulfillment request identifier for later user. In some embodiments, the central server computer 102 can modify the fulfillment request message to include the estimated weight.

Steps 412A and 412B can occur simultaneously or in any order. Step 412A leads to the processing of steps 414-418. Step 412B leads to the processing of steps 420-432. Steps 414-418 can occur at the same time as steps 420-432. The processing of steps 414-418 will be described first.

At step 412A, after providing the fulfillment request message to the service provider computer 106, the central server computer 102 can determine one or more transporters operating one or more transporter user devices 110 that are capable of fulfilling the fulfillment request message. The central server computer 102 can determine the one or more transporters from the transporter user devices. The central server computer 102 can determine the one or more transporter user devices based on whether or not the transporter user device is online, whether or not the transporter user device is already fulfilling a different fulfillment request message, a location of the transporter user device, etc.

At step 414, after determining the one or more transporter user devices, the central server computer 102 can provide the fulfillment request message, or a derivation thereof, to the one or more transporter user devices including the transporter user device 110.

At step 416, after receiving the fulfillment request message, the transporter of the transporter user device 110 can determine whether or not they want to perform the fulfillment. The transporter can decide that they want to perform the delivery of the one or more items from the service provider location to the end user location. The transporter user device 110 can generate an acceptance message that indicates that the fulfillment request is accepted.

At step 418, after generating the acceptance message, the transporter user device 110 can provide the acceptance message to the central server computer 102.

After providing the acceptance message to the central server computer 102, the transporter user device 110 can communicate with the navigation network 116 and the transporter can proceed to the service provider location to obtain the one or more items. The transporter user device 110 can then receive input from the transporter that indicates that the transporter obtained the one or more items (e.g., the transporter indicated that they picked up the items). The transporter user device 110 can then communicate with the navigation network 116 and the transporter can then proceed to the end user location to provide the one or more items to the end user. In some embodiments, the transporter user device 110 can provide update messages to the central server computer 102 that include a transporter user device 110 location and/or event data (e.g., items picked up, items delivered, etc.).

In some embodiments, after receiving the acceptance message, the central server computer 102 can notify the other transporter user devices that received the fulfillment request message that the fulfillment request is no longer available for acceptance.

Returning to step 412B, after step 410, the central server computer 102 can provide the fulfillment request message, or a derivation thereof, to the service provider computer 106. The central server computer 102 can determine which service provider computer of a plurality of service provider computers to communicate with based on the service provider indicated in the fulfillment request message. For example, the fulfillment request message can indicate that the one or more items are provided by the service provider of the service provider computer 106. The central server computer 102 can identify the service provider computer 106 using the service provider computer identifier in the fulfillment request message.

At step 420, the service provider computer 106 can provide the fulfillment request message to the scale system 120. In some embodiments, the central server computer 102 can provide the fulfillment request message to the scale system 120 directly. In other embodiments, the central server computer 102 may not provide the fulfillment request message to the service provider computer 106, but rather provide the fulfillment request message to the scale system 120, which provides the fulfillment request message to the service provider computer 106.

At step 422, after receiving the fulfillment request message, the service provider computer 106 can initiate preparation of the one or more items. For example, the service provider computer 106 can alert service providers (e.g., those preparing the items) at the service provider location. The service providers can prepare the one or more items for pick up by a transporter.

At step 424, after receiving the fulfillment request from the service provider computer 106, or in some embodiments the central server computer 102, the scale system 120 can obtain the estimated weight data based on the one or more items in the fulfillment request message.

In some embodiments, the central server computer 102 can determine the estimated weight data and include the estimated weight data into the fulfillment request message. The scale system 120 can then extract the estimated weight data from the fulfillment request message.

In other embodiments, the scale system 120 can determine the estimated weight data in a similar manner to how the central server computer 102 determined the estimated weight data.

At step 426, after obtaining the estimated weight data, the scale system 120 can obtain actual weight data from the scale 122 in the scale system 120. For example, a service provider can place a container on the scale 122 of the scale system 120 and can select a button on the scale computer 124 to indicate that the placed container includes the items for the fulfillment request message as indicated by the fulfillment request identifier. The actual weight data can include the weight data of the container as measured by the scale 122. For example, the scale 122 can measure actual weight data as 813 grams.

At step 428, after obtaining the estimated weight data, the scale system 120 can verify that the actual weight data corresponds to the estimated weight data. The scale system 120 can determine a difference between the estimated weight data and the actual weight data. The difference can indicate how close the actual weight data is to the estimated weight data. For example, the actual weight data can be 813 grams and the estimated weight data can be 800 grams. The scale system 120 can determine a difference of 13 grams.

The scale system 120 can compare the difference to a difference threshold. The difference threshold can be an amount of weight fluctuation between the estimated weight data and the estimated weight data to be considered as matching. The difference threshold can be a static value (e.g., 50 grams) or a dynamic value (e.g., within 5%). The dynamic value can indicate a percentage of the order weight (e.g., 6% of the order weight) or can indicate an expected variance of the item. For example, If there are 5 prior measurements of an item (e.g., a burger) in a database, and that the item varies by 45 g. The dynamic value can use the square root of the sum of variances of the items in the order as the threshold.

In some embodiments, the actual weight data can be obtained from a single measurement of the scale system 120. In other embodiments, the actual weight data can be obtained as a running average of the past x number of measurements (e.g., over 5 measurements, over 100 measurements, etc.). In yet other embodiments, the actual weight data can be obtained using a noise rejection algorithm.

As an illustrative example, the difference of 13 grams can be compared to a difference threshold of 50 grams. Since the 13 grams is smaller than the difference threshold of 50 grams, the scale system 120 can determine that the actual weight data matches the estimated weight data. If the dynamic value of within 5% were to be used, then the difference of 13 grams can be compared to the range of 800 grams+/−40 grams (e.g., 5% of 800 grams).

In other embodiments, the scale system does not receive or obtain the estimated weight data. Rather, the central server computer 102 can obtain the actual weight data from the scale system 120. The central server computer 102 can compare the estimated weight data to the actual weight data to determine if they match. The central server computer 102 can then perform additional processing, such as notifying the scale system 120 that the estimated and actual weights match, and that the order is complete and ready for delivery.

At step 430, the scale system can perform additional processing based on verifying the weight data. The scale system 120 can perform any suitable additional processing related to the actual weight data, the estimated weight data, the determination that the order is complete, and/or the fulfillment request message and/or data included therein. The verification that the actual weight data matches the estimated weight data can be used as a trigger event for additional processing.

As an example, additional processing can include processing image data. The scale system 120 can include a camera, as described herein. The camera can capture image data of the one or more items in the fulfillment request. In some embodiments, the image data can show the one or more items on the scale of the scale system 120. In other embodiments, the image data can show a closed container on the scale that includes the one or more items. The scale system 120 can perform additional processing based on the image data. For example, the scale system 120 can identify a fulfillment request identifier printed on the container in the image and compare the identified fulfillment request identifier to the fulfillment request identifier of the order. If the fulfillment request identifiers match, then the scale system 120 can proceed to the next step. If the fulfillment request identifiers do not match, then the scale system 120 can generate an alert that the identifiers do not match. The scale system 120 can provide the alert to the operators of the scale system 120 and/or the central server computer 102.

As another example, additional processing can include the scale system 120 utilizing the camera to determine a number of containers as well as a type of each container (e.g., paper bag, plastic bag, soup container, fry container, etc.). The scale system 120 can evaluate the number of containers and the type of containers. Estimated weights can be generated for each container based on the image of the container. The estimated weights of the containers can be utilized in the estimated weight of the current order (e.g., by revising the estimated weight) and/or in future orders (e.g., by revising container weight estimations in the central server computer 102).

As another example of additional processing, the scale system 120 can determine if the fulfillment request of the one or more items provided by the service provider is erroneous or fraudulent. The scale system 120 can utilize the actual weight data and the estimated weight data to determine if one or more items are missing from the order (e.g., the order is erroneous), as described herein. The scale system 120 can also determine that the service provider has provided an item that weighs less than a typical item in the order. For example, the scale system 120 can determine that an order of fries is 30 grams under what the typical order of fries should be. The scale system 120 can flag the order as erroneous or fraudulent since the order of fries weighs less than a typical order of fries. Such flags can be provided to the central server computer 102 for analysis, such as trend analysis.

As another example of additional processing, the scale system 120 can determine if the actual weight data exceeds a weight threshold for delivery of the one or more items to an end user. For example, the fulfillment request message, received by the scale system 120, can include a weight threshold for the order. The weight threshold can be based on the type of transport that is to be used to deliver the order. For example, a truck can have a different weight threshold than a bike. Furthermore, if the method of delivery transport is an autonomous vehicle, then the weight can be based on the weight that can be carried by the autonomous vehicle. For example, the autonomous vehicle can be an autonomous flying drone that has a weight limit that the autonomous flying drone needs to stay under so that the flight capabilities of the autonomous flying drone are not hindered. The weight threshold can be, for example, 1 pound, 5 pounds, 10 pounds, 25 pounds, etc. If the actual weight is below the weight threshold, then the one or more items can be manually or automatically located into an autonomous delivery vehicle.

The scale system 120 can determine whether or not the actual weight data exceeds the weight threshold for the fulfillment request message. The scale system 120 can generate a weight threshold flag (e.g., a Boolean value) that indicates whether or not the order is under the weight threshold. The scale system 120 can provide the weight threshold flag to the central server computer 102, which can notify the transporter device of the weight threshold flag.

If the weight threshold flag indicates that the actual weight data exceeds the weight threshold, and if the order is to be delivered via an autonomous flying drone, then the central server computer 102 can notify the autonomous flying drone that the order is too heavy to carry. The autonomous flying drone can proceed to the next pickup instruction. The central server computer 102 can then communicate with additional transporter user devices to facilitate the delivery of the order by a different transporter.

As an example, additional processing can include generating a notification that indicates that the order is ready for pickup. As such, the notification can indicate that the one or more items are completed and are ready to deliver to the end user.

At step 432, the scale system 120 can provide a notification to the central server computer 102 that indicates that the order is completed ready for pickup. The notification can include the fulfillment request identifier.

At step 434, after receiving the notification that the one or more items are completed and are ready to deliver to the end user from the scale system 120, the central server computer 102 can provide the notification to the transporter user device 110.

In some embodiments, if the central server computer 102 performs additional processing after determining that an estimated weight and actual weight match, then the central server computer 102 can provide the notification that the order is ready for pickup.

In some embodiments, the central server computer 102 can provide the notification after communicating with the transporter user device 110 during steps 414-418. In other embodiments, the notification can be provided to the transporter user device 110 along with the communication during steps 414-418.

At step 436, at any point after receiving the acceptance message, the central server computer 102 can check the status of the fulfillment request. For example, the central server computer 102 can determine the location of the transporter user device 110 and can determine an estimated amount of time for the transporter user device 110 to arrive at the end user location.

At step 438, the central server computer 102 can provide an update message to the end user device 108 that includes data related to the fulfillment of the fulfillment request message. The data can include an estimated amount of time, the transporter user device location, event data (e.g., items picked up from the service provider), and/or other data related to the fulfillment of the fulfillment request message.

At step 440, the central server computer 102 can store any data received, sent, and/or processed during the fulfillment of the fulfillment request message into a database. For example, the central server computer 102 can store a user's cart selection as user features into a user feature database.

Figure 5:
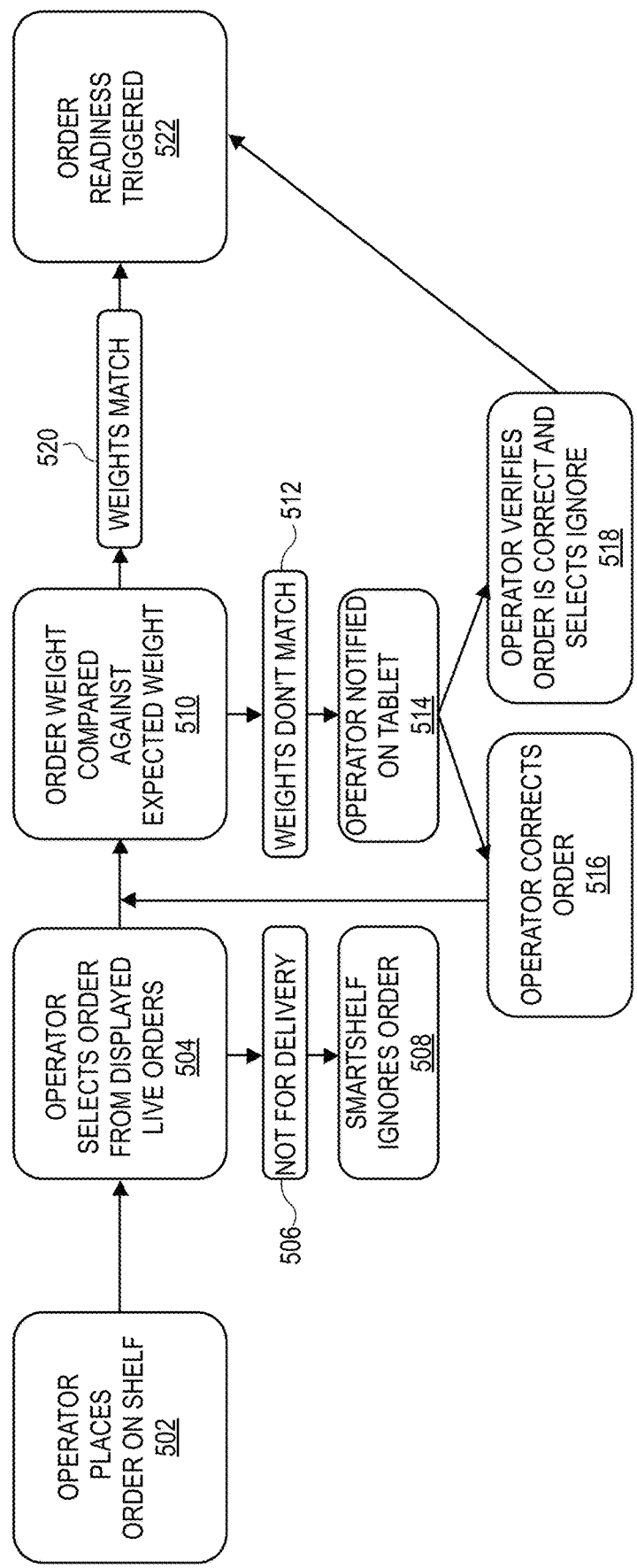
FIG. 5 shows a flow diagram of a scale operation method according to embodiments.

FIG. 5 shows a flow diagram of a scale operation method according to embodiments. The method illustrated in FIG. 5 can be performed using a scale system, which can be a smart shelf. The flow diagram will be described from a perspective of a service provider employee (e.g., operator) using the scale system to process an order. Prior to step 502, an end user may have provided a fulfillment request for one or more items to a central server computer. The central server computer can create an order based on data relating to the fulfillment request (e.g., item information, estimated weights of the item, etc.) and send the order to a service provider computer in communication with the smart shelf. The service provider can then prepare the item(s) in the order.

The scale system can allow for multiple orders to be placed on the scale system. For example, a service provider, such as a restaurant, may currently have five pending orders. Two of the orders may be for dine-in customers, while the other three may be prepared for delivery. The scale system can be configured to ignore the weight of orders placed on the scale that are not prepared for delivery (e.g., are for dine-in customers).

At step 502, an operator (e.g., service provider employee) can complete the order and can place the order item(s) on the scale system. For example, the operator can prepare and then place the one or more items, as indicated in the fulfillment request message, into a container. The operator can place the container onto a scale on the scale system.

At step 504, the scale system can have a display which displays a plurality of orders. The operator can select the order of the displayed orders that the service provider currently needs to fulfill. The order can be the order that corresponds to the container placed on the scale.

The scale system can determine whether or not the order corresponds to an order that is to be delivered via a transporter as arranged by the central server computer. If the scale system determines that the selected order is not associated with the central server computer, then the scale system can proceed to step 506. In such a case, the scale system can ignore the weight of orders that are not prepared for delivery. If the scale system determines that the selected order is associated with the central server computer, then the scale system can proceed to step 510.

In some embodiments, at steps 506-508, the scale system can determine that the order is not an order that is prepared for delivery. For example, a restaurant employee may place an order of food on the scale system that is for a dine-in customer. The order would not be considered when determining weights of other orders of items on the scale system. The scale system can ignore the weight of the order. If the order is the first one placed on the shelf, then the shelf may be re-adjusted to zero pounds or zero kilograms (e.g., tared to zero), even though the order is on the scale system.

In other embodiments, the scale system can process both orders that are prepared for delivery and orders that are prepared for dine-in. For example, a restaurant employee may place an order of food on the scale system that is for a dine-in customer. The order of food can be processed in the same manner as orders that are prepared for delivery. Later, once the food order is verified, the food order can be provided directly to the user for dine-in.

At step 510, if the order is an order that is prepared for delivery, then the scale system (or a central server computer in communication with the scale system) then measure the weight of the order (e.g., obtain actual weight data). For example, the actual weight data of the order can be the difference between the load on the scale before the order was placed on a load receiving plate of the scale and the load on the scale after the order was placed on the load receiving plate.

The scale system can compare the actual weight data to previously received estimated weight data (e.g., received along with the fulfillment request message). If the actual weight data matches the estimated weight data, then the scale system can proceed to step 520-522. If the actual weight data does not match the estimated weight data, then the scale system can proceed to step 512-514. In other embodiments, the scale system can provide the actual weight data to the central server computer for comparison of weight data.

The scale system can perform additional processing based on the comparison of the actual weight data and the estimated weight data. Examples of additional processing will be discussed.

At steps 512-514, the expected weight of the order and the measured weight of the order may not match or may not be within a predetermined threshold of each other. The scale system can provide a notification to the operator of the smart scale that the order placed on the scale does not match the estimated weight data for the order. The scale system can provide one or more options to the operator of the smart scale to resolve the weight discrepancy. For example, the following two options are examples of additional processing that the scale system can perform. The additional processing can include determining if the fulfillment request of the one or more items provided by the service provider is erroneous or fraudulent.

One option, at step 516, can involve the operator correcting the order if there is an error in the order. For example, the operator can add forgotten items to the order, remove erroneous items from the order, select to re-weight the order since something else may have erroneously added to the weight (e.g., someone leaned on the scale), place the correct order on the scale, and/or any other action to remedy the discrepancy between the actual weight data and the estimated weight data.

Another option, at step 518, can involve the operator selecting that the weight is indeed correct even though the order weight comparison indicates that the actual weight data does not match the estimated weight data. Such a situation may occur if new sizes were introduced at the restaurant or if the meal sizes changed, but the central server computer has not yet received updated/recent weight data for these changes.

At step 520, after comprising the actual weight data and the estimated weight data, the scale system can determine that the actual weight data and the estimated weight data match (or are within an acceptable difference threshold).

At step 522, after the scale system determines that the actual weight data and the estimated weight data match, the scale system can perform additional processing. For example, the scale system can trigger an order readiness flag. The scale system can generate notification that indicates that the order is ready for pickup and is located on the scale. The scale system can provide the notification to the central server computer, which may notify a transporter that is assigned to deliver the order that the order is ready for pickup and is located on the scale.

As another example, additional processing can include the scale system receiving image data from a camera. The camera can be included in the scale system and may capture images of loads on the load receiving plate of the scale. The scale system can receive image data of the one or more items in the fulfillment request. The scale system can evaluate the image data to confirm that the container in the image includes a barcode, QR code, or fulfillment request identifier that matches the fulfillment request identifier of the order, as received in the fulfillment request message.

For example, the scale system can process the image data using a machine learning model that was trained to identify text in an image. The scale system can utilize the machine learning model to identify and parse an fulfillment request identifier that is written or printed on the side of the container placed on the scale. The scale system can raise an error flag to the operator of the scale system if the fulfillment request identifier on the container, as obtained by the camera, does not match the fulfillment request identifier selected by the operator during step 504.

Figure 6:
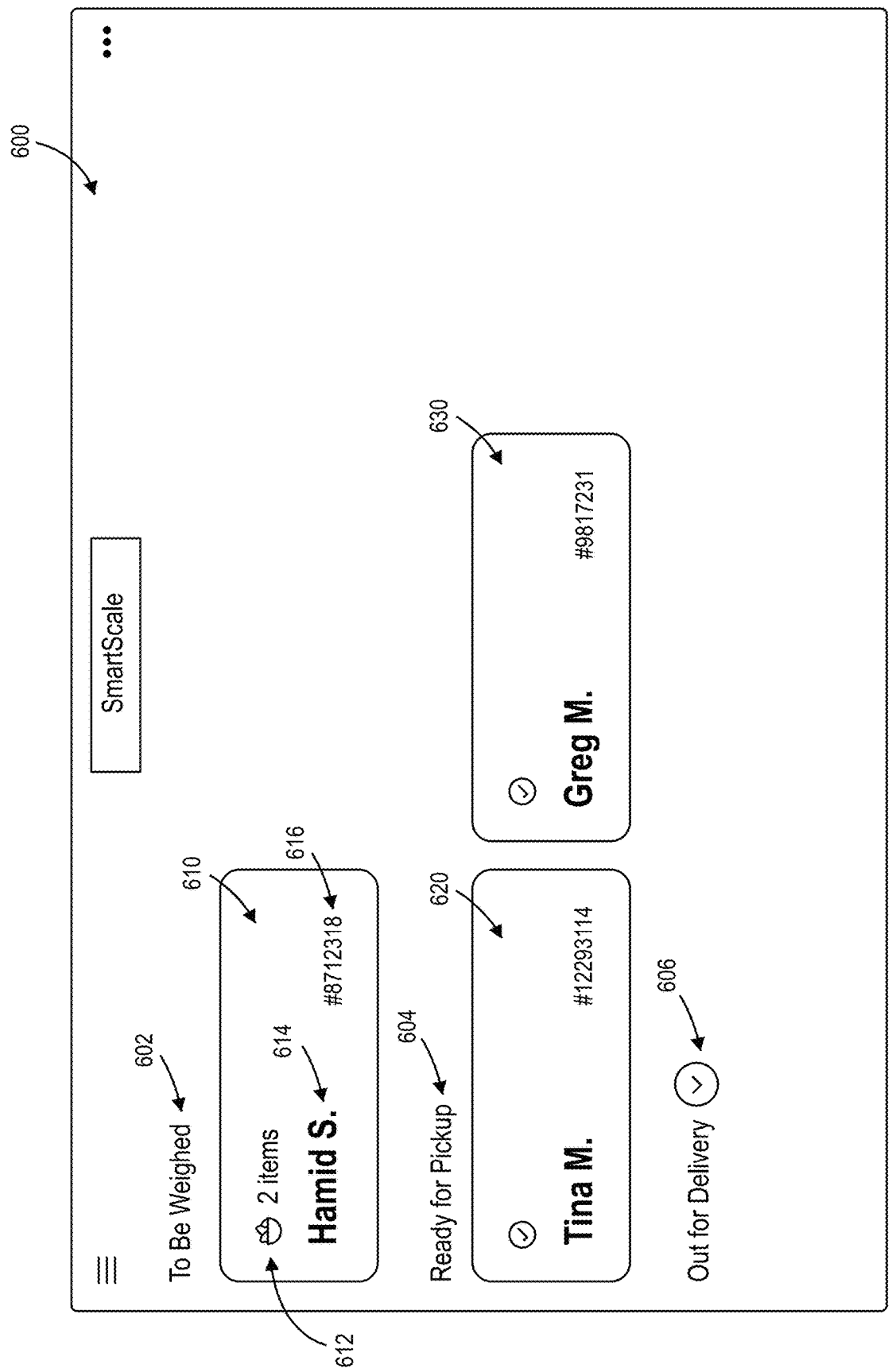
FIG. 6 shows a user interface illustrating a pending order according to embodiments.

FIG. 6 shows a user interface 600 illustrating a pending order according to embodiments. FIG. 6 includes the user interface 600, which can be displayed by the scale computer 124. The user interface 600 can be a 'home' screen. The user interface 600 includes three sections, a "to be weighed" section 602, a "ready for pickup" section 604, and an "out for delivery" section 606. The different sections can indicate different phases of preparing and providing items to end users. Each section can include orders that correspond to fulfillment request messages received from the central server computer 104. Three example orders are illustrated in the user interface 600: a first order 610, a second order 620, and a third order 630.

The first order 610 includes an indication of how many items are in the order as indicated by an item count 612. The first order 610 also includes an order name 614, which can be a name of the end user that the order is for. The first order also includes an order number 616 that can be a unique identifier that identifies the order.

A scale user (e.g., an employee of a service provider) can utilize the scale system 120 and the user interface 600 to view and interact with orders. For example the scale user can interact with the scale system 120 to weigh an order. The scale user can place the order on the scale 122 of the scale system 120. For example, the scale user can place a closed container, such as a bag, that includes the items for the order that is to be weighed (e.g., order number 8712318). The scale user can then select the first order 610 on the displayed user interface 600 on the scale computer 124. For example, the user interface 600 can be displayed on a touch screen, where the scale user can touch the screen to select the first order 610. Upon selecting the first order, the scale computer 124 can display an indication of whether or not the actual weight of the order matches an estimated weight of the order.

After, the scale user selects the first order 610 in the user interface 600, the scale computer 124 may identify that the actual weight of the container placed on the scale 122 is lighter than the estimated weight for the order. The scale computer 124 can display the user interface illustrated in FIG. 7.

Figure 7:
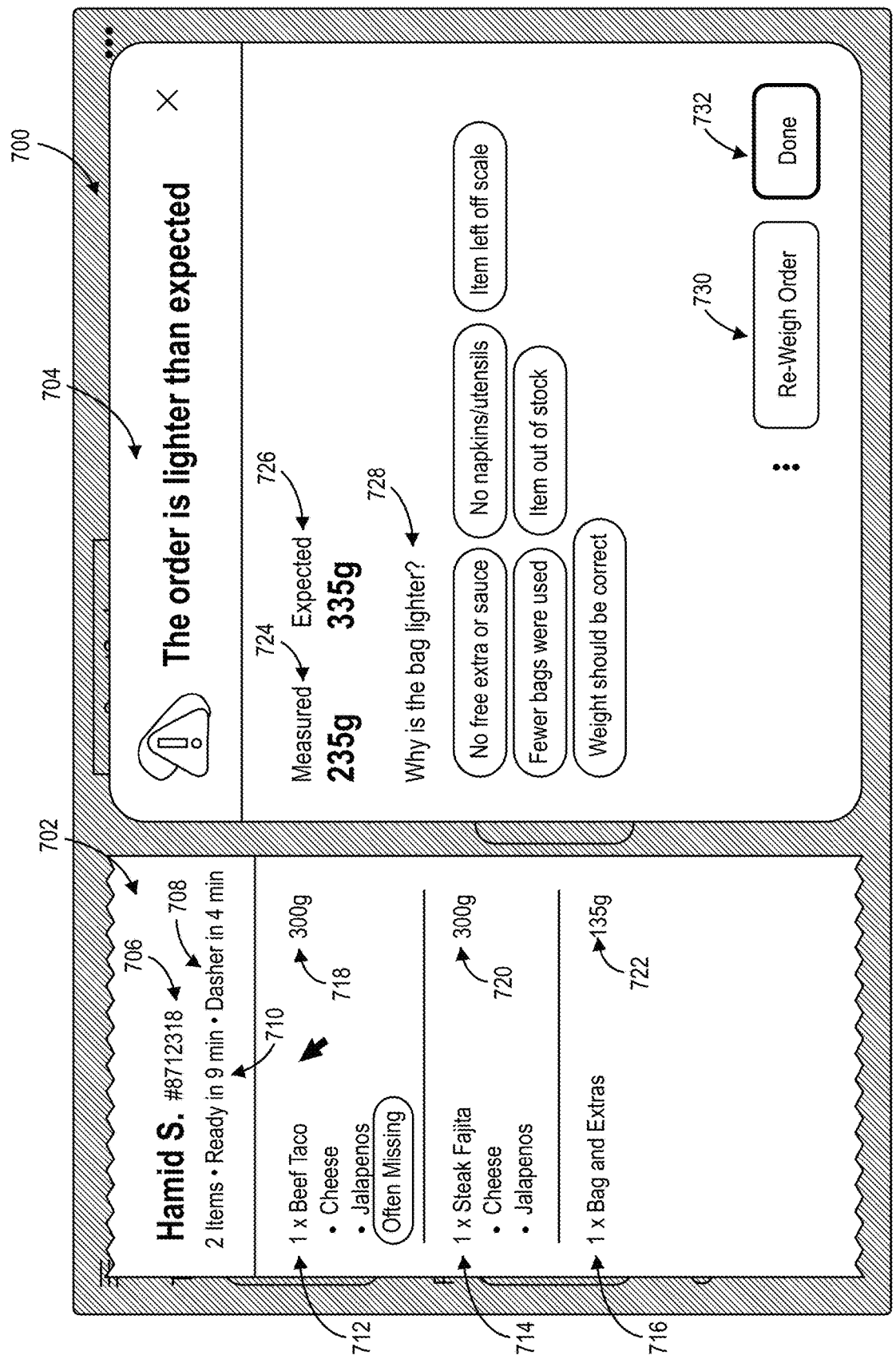
FIG. 7 shows a user interface illustrating an order weight discrepancy according to embodiments.

FIG. 7 shows a user interface 700 illustrating an order weight discrepancy according to embodiments. The user interface 700 can be displayed by the scale computer 124 after a weight discrepancy is detected. The user interface 700 can include an order details section 702 and an order weight comparison section 704.

The order details section 702 can include information regarding the order that the scale user is weighing. The order details section 702 can include an order number (e.g., order 8712318), an estimated order ready time 710, and an estimated transporter arrival time 708. The order details section 702 also indicates what items are included in the order as well as the estimated weight of each item in the order. For example, the order details section 702 includes a first item 712 (e.g., beef taco and selected toppings), a second item 714 (e.g., steak fajita and selected toppings), and additional weight adding items (e.g., a bag and extras such as forks, sauces, napkins, etc.). The order details section 702 also indicates a first item estimated weight 718 (e.g., 300 grams), a second item estimated weight (e.g., 300 grams), and an additional weight adding items estimated weight (e.g., 135 grams).

The order weight comparison section 704 displays a total actual weight 724 (e.g., a measured weight) and a total estimated weight 726 (e.g., an expected weight) of the order. The order weight comparison section 704 can notify the scale user that the total actual weight 724 is less than the total estimated weight 726.

The user interface 700 provides a number of options to the scale user for remedying the weight discrepancy. For example, the order weight comparison section 704 includes a number of reasons why the actual weight is lighter than expected 728. The scale user can select a reason why there is a weight discrepancy. The reasons include, for example, no free extra or sauce, no napkins/utensils, item left off scale, fewer bags were used, item out of stock, or weight should be correct.

The order weight comparison section also includes a re-weigh order button 730 and a done button 732. The re-weight order button 730 can cause the scale computer 124 communicate with the scale 122 to obtain a new actual weight of the order. For example, the scale user can add a forgotten item to the bag of items on the scale 122 and then select to re-weight the order. When there is no discrepancy between the actual weight and the measured weight, or the scale user has selected one or more reasons why there is a weight discrepancy, the scale user can push the done button 732 to continue to the user interface illustrated in FIG. 8.

Figure 8:
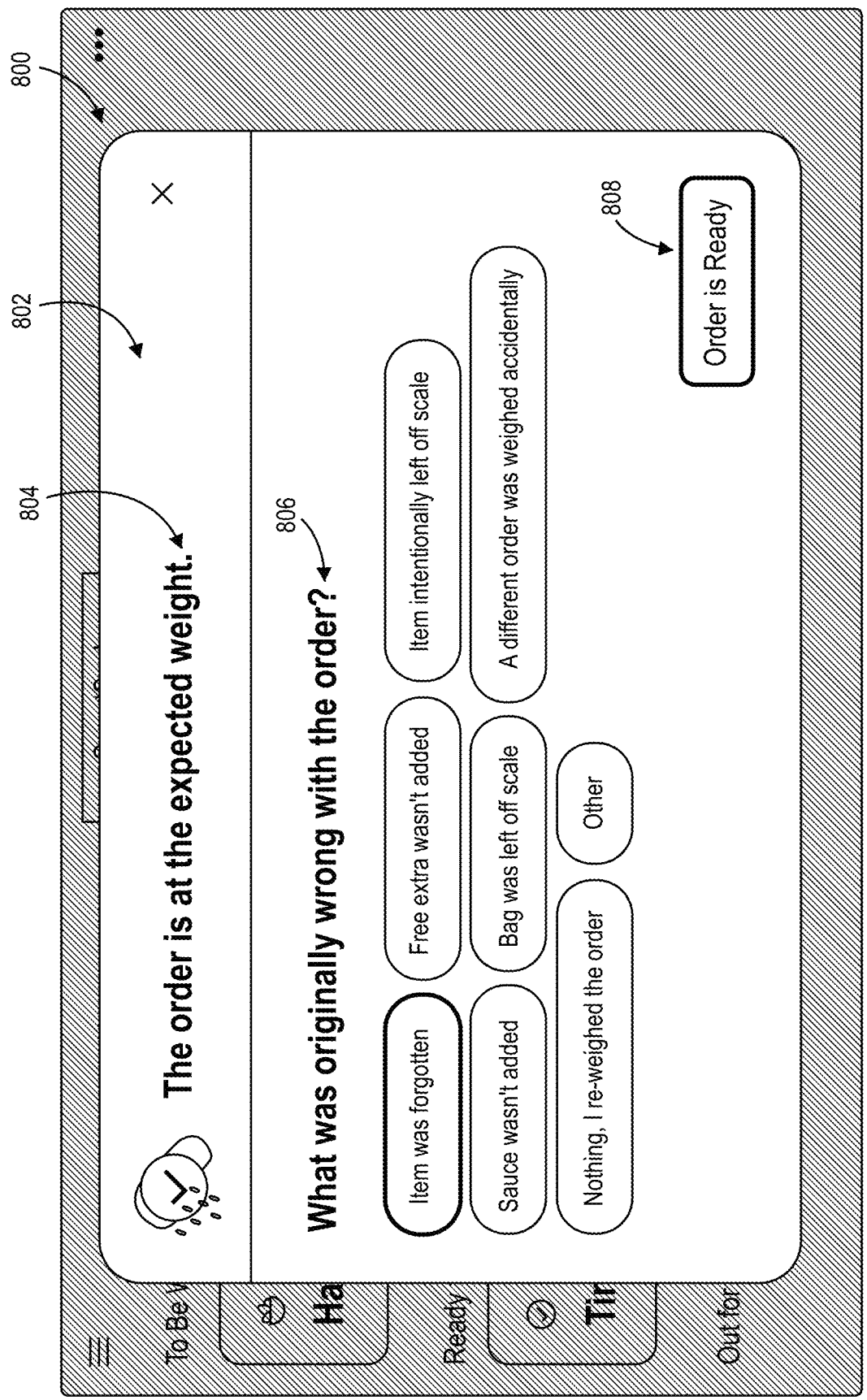
FIG. 8 shows a user interface illustrating a first order weight correction according to embodiments.

FIG. 8 shows a user interface 800 illustrating a first order weight correction according to embodiments. The user interface 800 includes an expected weight menu 802 that displays a correct weight notification 804 to the scale user, indicating that the order on the scale 122 is now at the expected weight (e.g., the estimated weight matches the actual weight). The expected weight menu 802 also includes options for reasons why the initial actual weight was different than the estimated weight 806. For example, the expected weight menu 802 can include selectable reasons such as item was forgotten, free extra wasn't added, item intentionally left off scale, sauce wasn't added, bag was left off scale, a different order was weighed accidentally, etc. The expected weight menu 802 also includes an order is ready button 808 that the scale user can select to continue. After the order is ready button 808 is pressed, the scale computer 124 can display the user interface illustrated in FIG. 9 if an item was forgotten, as indicated by the scale user.

Figure 9:
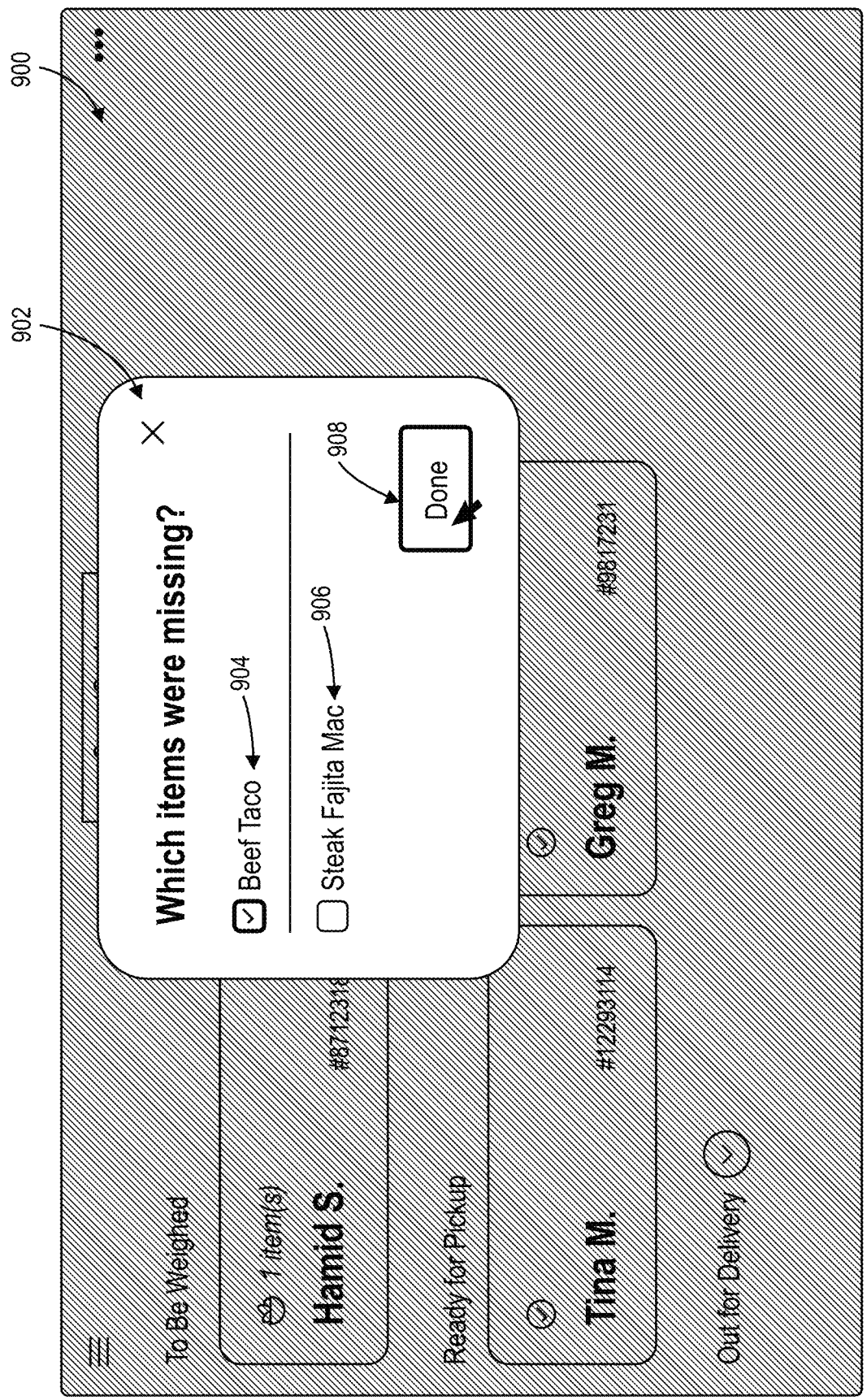
FIG. 9 shows a user interface illustrating a second order weight correction according to embodiments.

FIG. 9 shows a user interface 900 illustrating a second order weight correction according to embodiments. The user interface 900 includes a select missing item popup 902. If the scale user indicated that an item was initially forgotten and left off of the scale 122 during the initial weighing of the order, then the scale computer 124 can prompt the scale user to select which item of the order was missing via the select missing item popup 902. The select missing item popup 902 can include selectable options that correspond to the items of the order. For example, the select missing item popup 902 can include a first item 904 (e.g., beef taco) and a second item 906 (e.g., steak fajita mac). The scale user can select which item was forgotten (e.g., that the beef taco was forgotten). The select missing item popup 902 can also include a done button 908 to submit the selection.

Figure 10:
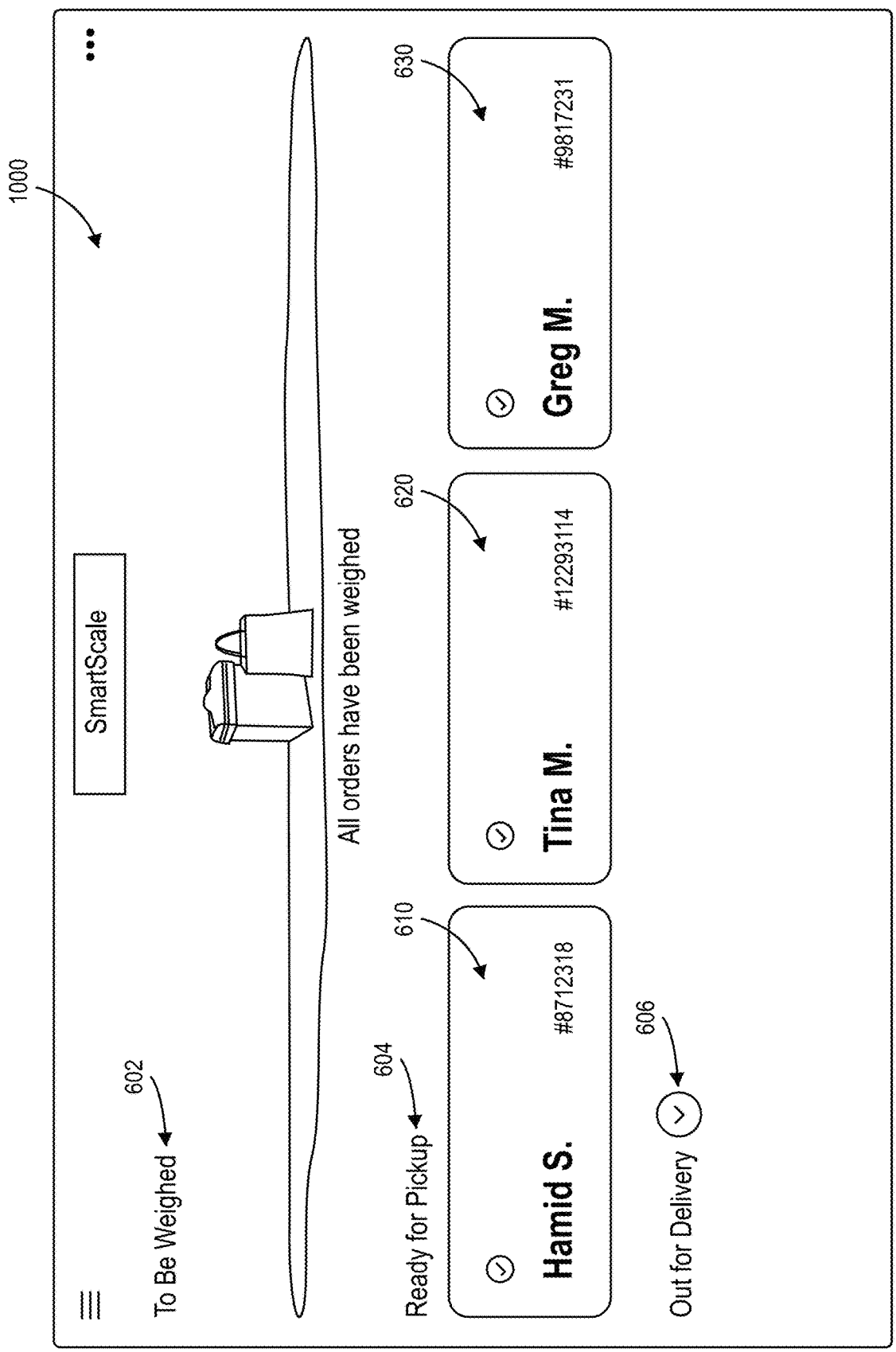
FIG. 10 shows a user interface illustrating an order that is ready for pickup according to embodiments.

After receiving input that indicates that the done button 908 was pushed, the scale computer 124 can return to the 'home' screen, as illustrated in FIG. 10.

FIG. 10 shows a user interface 1000 illustrating an order that is ready for pickup according to embodiments. The user interface 1000 includes the three sections described in reference to FIG. 6, including the "to be weighed" section 602, the "ready for pickup" section 604, and the "out for delivery section" 606. After the scale user submits the order for pickup, the first order 610 can move from the to be weighted section 602 to the ready for pickup section 604.

At a later point in time, once the order is collected for delivery, the relevant order can be selected in the ready for pickup section 604 and moved to the out for delivery section 606.

Figure 11:
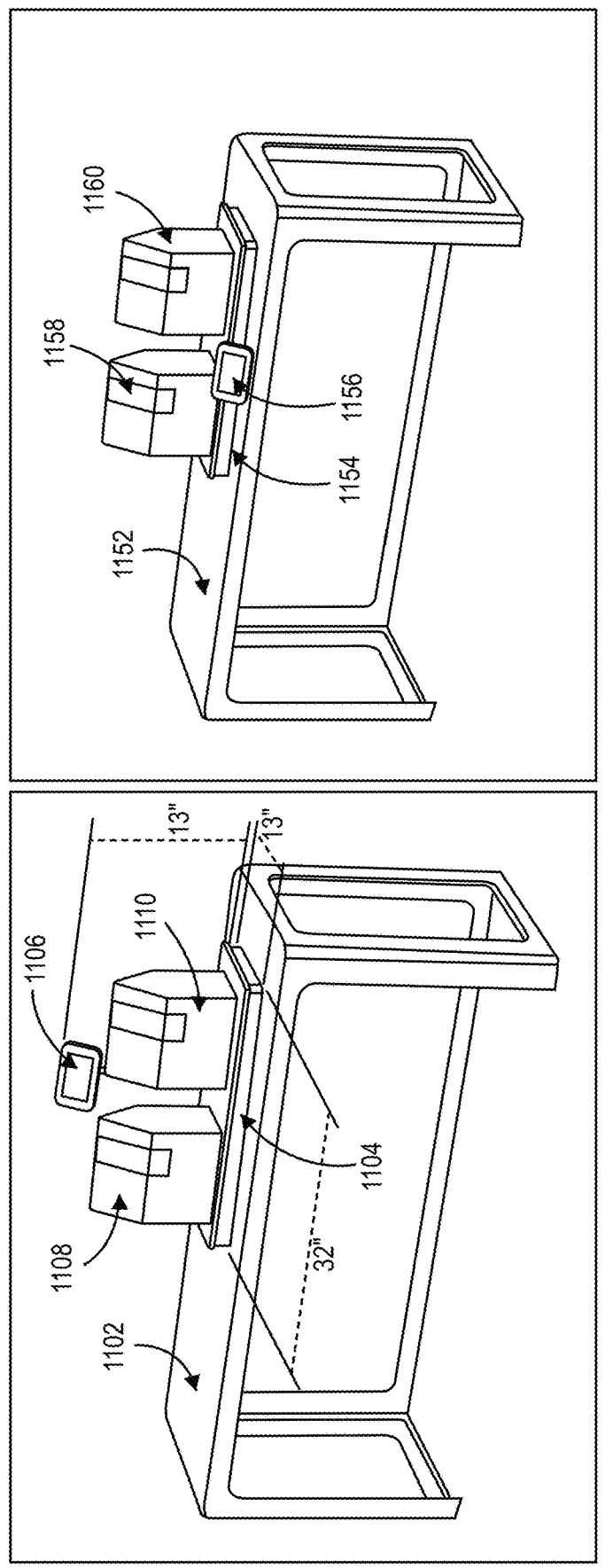
FIG. 11 shows perspective images of a scale system according to embodiments.

FIG. 11 shows perspective images of a scale system according to embodiments. FIG. 11 includes two example variations of the scale system, including a first scale system 1100 and a second scale system 1150.

The first scale system 1100 includes a first shelf 1102, a first scale 1104, and a first scale computer 1106. The first shelf 1102 can be a structure that provides a surface for the storage objects. For example, the first shelf 1102 can provide a surface upon which the first scale 1104 is situated. The first shelf 1102 can be a structure made out of metal, plastic, wood, etc. or a combination thereof. The first shelf 1102 can be a table or a counter.

The first scale 1104 can be placed on the first shelf 1102. The first scale 1104 can be situated on a flat horizontal portion of the first shelf 1102. The first scale 1104 can be of a size that allows for one or more loads to be place on a load receiver plate of the first scale 1104. For example, a first order 1108 and a second order 1110 can be placed on the first scale 1104.

The first scale computer 1106 can be connected via an electro mechanical connection to the back (e.g., as seen from the perspective of the image in FIG. 11) of the first scale 1104. The first scale computer 1104 can be connected to the first scale 1104 with a rod assembly that raises the height of the first scale computer 1106 from the height of the first scale 1104. As such, the first scale computer 1104 can be visible by an operator over any loads (e.g., the first order 1108 and the second order 1110) placed on the first scale 104.

The first order 1108 and the second order 1110 can each include one or more items as indicated in a fulfillment request message corresponding to the order. The one or more items can be placed in a closed container, which can then be placed on the load receiving plate of the first scale 1104.

The second scale system 1150 includes a second shelf 1152, a second scale 1154, and a second scale computer 1156. The second shelf 1152 can be a structure that provides a surface for the storage objects. The second shelf 1152 can be similar to the first shelf 1102. The second scale 1154 can be similar to the first scale 1104.

The second scale computer 1156 can be connected via an electro mechanical connection to the second scale 1154. The second scale computer 1156 can be connected to the front (e.g., as seen from the perspective of the image in FIG. 11) of the second scale 1154.

A third order 1158 and a fourth order 1160 can be placed on the second scale 1154. As an example, the third order 1158 can include a first item and a second item with weights W1 and W2, respectively. The fourth order 1160 can include a third item, a fourth item, and a fifth item with weights W3, W4, and W4, respectively. Furthermore, the containers for each item can have a weight of WC. The second scale 1154 can begin at a weight reading of zero, when no order is placed on the second scale 1154. When the third order 1158 is placed on the second scale 1154, the second scale 1154 can record a third order actual weight data equal to W1+W2+WC. When the fourth order 1160 is placed on the second scale 1154, the second scale 1154 can record a weight of W1+W2+(2*WC)+W3+(2*W4) as the new total weight. The second scale 1154 can determine the difference in weight (e.g., the weight change) by subtracting the third order actual weight data from the new total weight to obtain the fourth order actual weight data. For example, the second scale 1154 can perform: [W1+W2+(2*WC)+W3+(2*W4)]−[W1+W2+WC]=W3+(2*W4)+WC. Therefore, the second scale 1154 can record fourth order actual weight data equal to W3+(2*W4)+WC.

Figure 12:
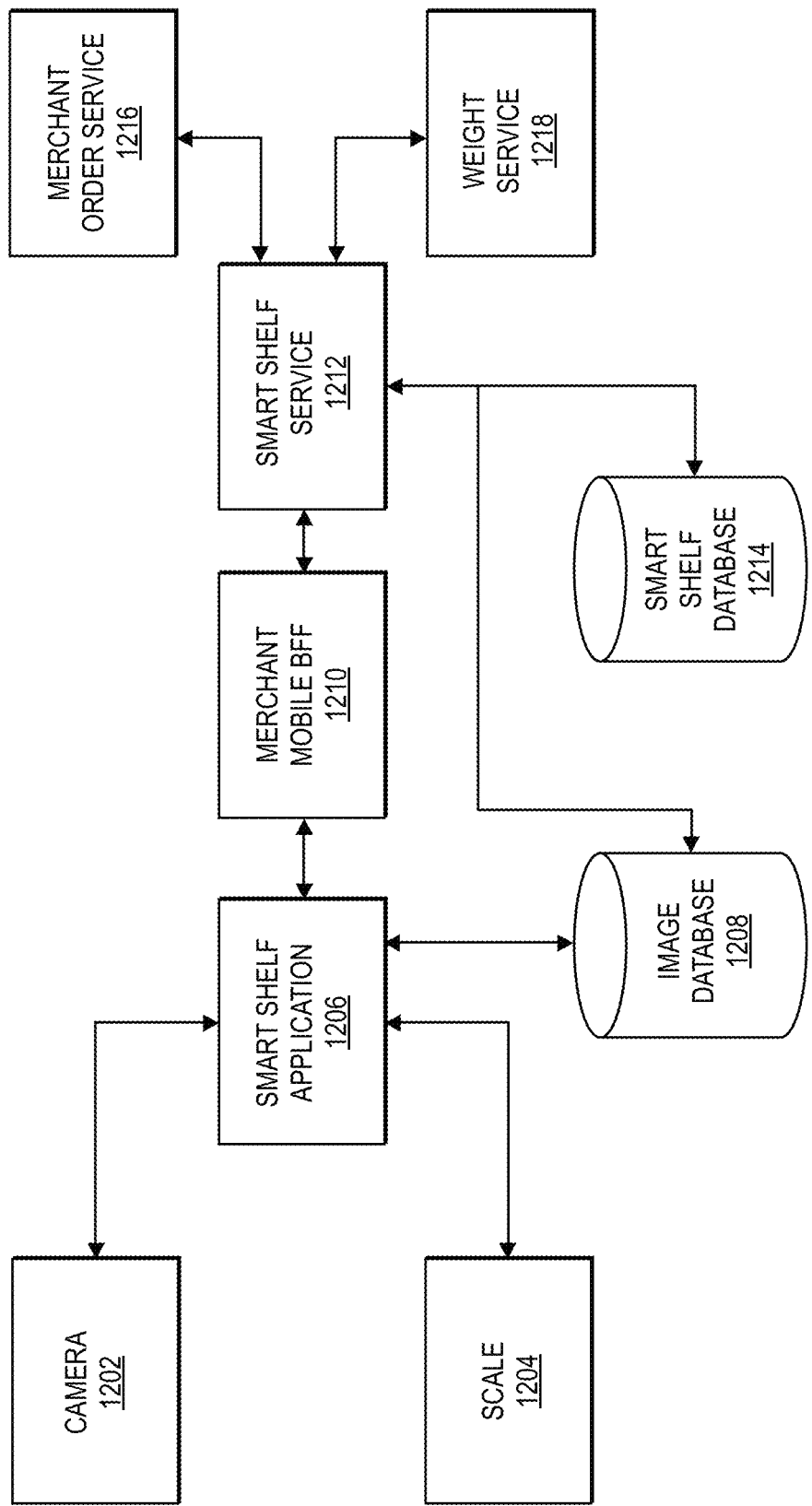
FIG. 12 shows a block diagram illustrating components of a weight processing system according to embodiments.

FIG. 12 shows a block diagram illustrating components of a weight processing system according to embodiments. FIG. 12 illustrates an example weight processing system that includes a camera 1202, a scale 1204, a smart shelf application 1206, an image database 1208, a merchant mobile computer 1210 (e.g., such as a merchant mobile BFF (back-end for frontend)), a smart shelf service 1212, a smart shelf database 1214, a merchant order service 1216, and a weight service 1218.

A central server computer (e.g., the central server computer 104) can include the smart shelf service 1212, the smart shelf database 1214, the merchant order service 1216, and the weight service 1218. In some embodiments, the central server computer can include the image database 1208.

A scale system (e.g., the scale system 120) can include the camera 1202, the scale 1204, and the smart shelf application 1206.

The camera 1202 can capture image data of loads placed on the scale 1204 (e.g., food order). The camera 1202 can be a device for recording visual images in the form of photographs, film, or video signals. The camera 1202 can capture image data of items and/or closed containers on the scale 1204.

The scale 1204 can capture actual weight data of orders placed on the scale 1204. The scale 1204 can be coupled to the camera 1202 and a scale computer that includes the smart shelf application 1206. The scale 1204, the camera 1202, and the smart shelf application 1206 can collectively be included in a scale system.

The smart shelf application 1206 can provide an interface which can display orders, corresponding to fulfillment request messages, to operator(s) of the scale system. The smart shelf application 1206 can be installed on a scale computer coupled to the scale 1204. The smart shelf application 1206 can receive input (e.g., via a touch screen and/or buttons) from operators (e.g., service providers). For example, operators can select an order in the smart shelf application 1206 when placing the one or more items of the order on the scale 1204.

The image database 1208 can be a database that stores image data. The smart shelf application 1206 can obtain image data from the camera 1202. The smart shelf application 1206 can transmit the image data to the image database 1208. The image database 1208 can be a remote database, with respect to the service provider location. The image database 1208 can be a cloud based storage database.

The merchant mobile computer 1210 can facilitate the communication between the smart shelf application 1206 and the smart shelf service 1212. The merchant mobile computer 1210 can allow the scale system (which includes the smart shelf application 1206) to communicate with the central server computer (which includes the smart shelf service 1212). The merchant mobile computer 1210 can implement the backend for frontend architecture pattern, as known to one of skill in the art.

The smart shelf service 1212 can be a service that facilitates the processing of the order including updating the status of the order, notifying transporters (e.g., deliverers) that the order is ready, etc. The status of the order can be stored in the smart shelf database 1214.

The smart shelf service 1212 can use an API with the following exemplary code included in Table 1.

TABLE 1

Example API Code 1

```
syntax = "proto3";
package smart_shelf.v1;
option java_generic_services = true;
option java_package = "com.doordash.rpc.smart_shelf";
option java_outer_classname = "Service";
import "google/protobuf/wrappers.proto";
import "common/service_client_config.proto";
import "google/protobuf/timestamp.proto";
// Service dealing with Smart Shelf operations
service SmartShelfService {
  // Get the current state of the smart shelf
  rpc GetSmartShelfState(GetSmartShelfStateRequest) returns (GetSmartShelfStateResponse);
  // Order has been identified by camera or operator
  rpc IdentifyOrder(IdentifyOrderRequest) returns (IdentifyOrderResponse);
  // Update weight of an order based on scale reading
  rpc UpdateOrderWeight(UpdateOrderWeightRequest) returns (UpdateOrderWeightResponse);
}
enum SmartShelfDeliveryState {
  WAITING = 0;
  ON_SHELF = 1;
  DONE = 2;
}
enum SmartShelfOrderIdentificationMethod {
  CAMERA = 0;
  OPERATOR = 1;
```

TABLE 1-continued

Example API Code 1

```
}
message SmartShelfDelivery {
  // Unique ID (UUID) of the delivery
  string delivery_uuid = 1;
  // Name of consumer who placed order
  string consumer_name = 2;
  // Subtotal of the order
  string subtotal = 3;
  // Number of items in the order
  string num_items = 4;
  // Estimated order ready time for the order
  string estimated_ready_at = 5;
  // Estimated weight in grams
  float expected_weight = 6;
  // Weight on scale in grams
  float recorded_weight = 7;
  // Weight on scale in grams
  google.protobuf.Timestamp weight_recorded_at = 8;
  // Current state of the order (from perspective of the shelf)
  SmartShelfDeliveryState state = 9;
  // Method with which the order was identified
  SmartShelfOrderIdentificationMethod identification_method = 10;
  // Timestamp when identification was done
  google.protobuf.Timestamp identified_at = 11;
}
// Request to get the current state of the smart shelf
message GetSmartShelfStateRequest {
  // Unique ID (UUID) of the smart shelf
  string shelf_id = 1;
}
// Response with current state of the smart shelf
message GetSmartShelfStateResponse {
  // Smart shelf deliveries
  repeated SmartShelfDelivery deliveries = 2;
}
// Request to identify an order
message IdentifyOrderRequest {
  // Unique ID (UUID) of the delivery
  string delivery_uuid = 1;
  // Method with which the order was identified
  SmartShelfOrderIdentificationMethod identification_method = 8;
  // Timestamp when identification was done
  google.protobuf.Timestamp identified_at = 9;
}
// Response to identify an order
message IdentifyOrderResponse {
  // Pre-signed url to upload an image of shelf with new order
  string image_upload_url = 1;
}
// Request to update order weight reading
message UpdateOrderWeightRequest {
  // Unique ID (UUID) of the delivery
  string delivery_uuid = 1;
  // Weight on scale in grams
  float recorded_weight = 2;
}
// Response to update order weight reading
message UpdateOrderWeightResponse {
}
```

The merchant order service 1216 can provide detailed information about the order (e.g., number of items in the order). The weight service 1218 can provide estimated weight of the items in the order. The weight service 1218 can include an API with the following code illustrated in Table 2.

TABLE 2

Example API code 2

```
syntax = "proto3";
package weight.v1;
option java_generic_services = true;
option java_package = "com.doordash.rpc.weight";
```

TABLE 2-continued

Example API code 2

```
option java_outer_classname = "Service";
import "google/protobuf/wrappers.proto";
import "common/service_client_config.proto";
import "google/protobuf/timestamp.proto";
// Service dealing with item and order weights
service WeightService {
  // Estimates the weight of an order
  rpc EstimateOrderWeight(EstimateOrderWeightRequest) returns
(EstimateOrderWeightResponse);
  // Record actual weight of an order
  rpc RecordOrderWeight(RecordOrderWeightRequest) returns
(RecordOrderWeightResponse);
}
// Request to get estimated weight of an order
message EstimateOrderWeightRequest {
  // Id of the order
  string order_id = 1;
}
// Response with estimated weight of an order
message EstimateOrderWeightResponse {
  // Estimated order weight in grams
  float estimated_weight = 1;
}
// Request to record the weight of an order
message RecordOrderWeightRequest {
  // Id of the order
  string order_id = 1;
  // Order weight in grams
  float weight = 2;
}
// Response to record weight of an order
message RecordOrderWeightResponse {
}
```

Figure 13:
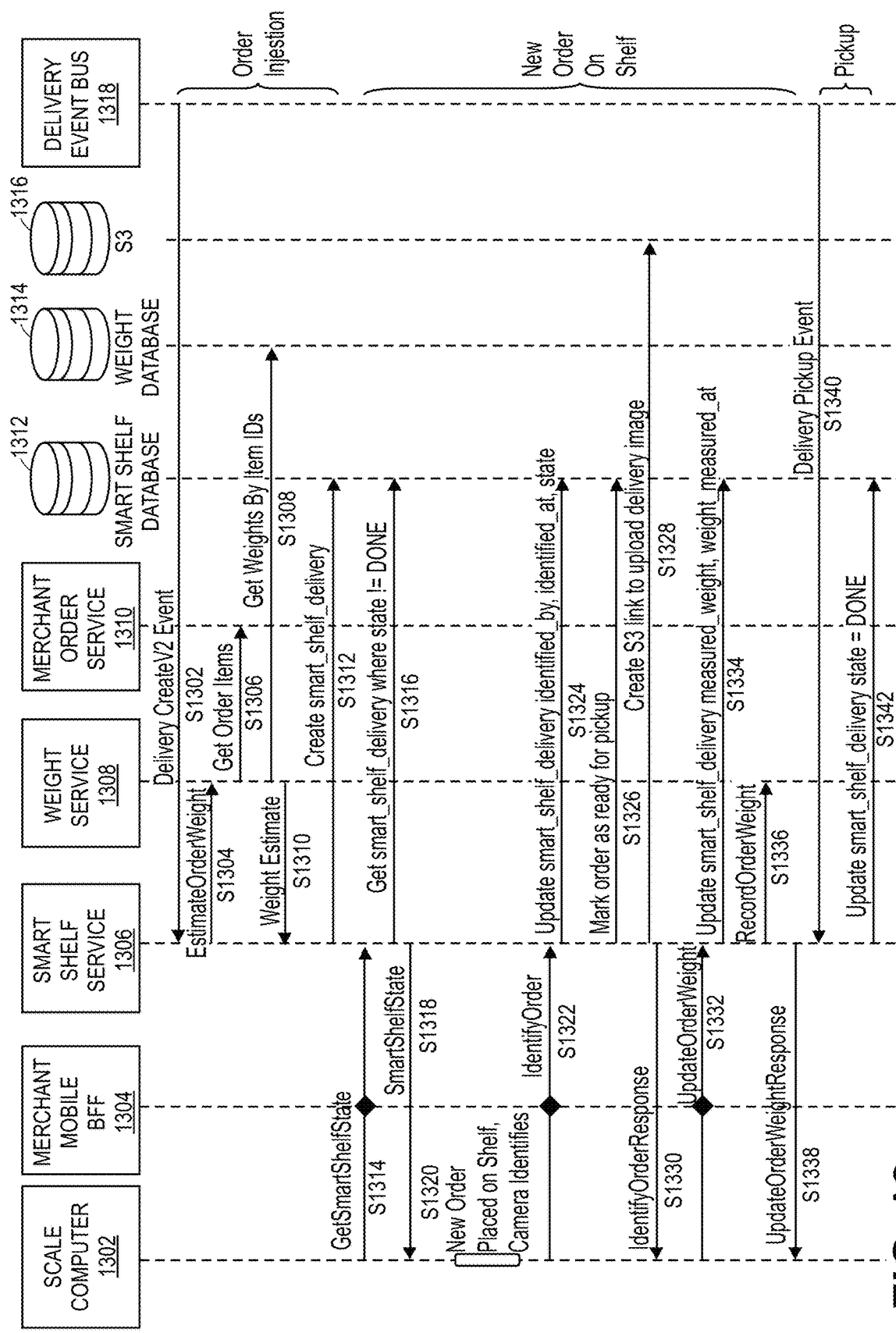
FIG. 13 shows a flow diagram of an order weight processing method according to embodiments.

FIG. 13 shows a flow diagram of an order weight processing method according to embodiments. The method illustrated in FIG. 13 can be performed by a scale computer 1302, a merchant mobile computer 1304, a smart shelf service 1306, a weight service 1308, a merchant order service 1310, a smart shelf database 1312, a weight database 1314, an image database 1316, and a delivery event bus 1318.

The merchant mobile computer 1304, the smart shelf service 1306, the weight service 1308, the merchant order service 1310, the smart shelf database 1312, the weight database 1314, the image database 1316, and the delivery event bus 1318 can be part of a server computer such as the central server computer 104. The scale computer 1302 can be a part of the scale system 120.

FIG. 13 can be divided into three phases: steps S1302 to S1312 can include creating an order based on the data relating to a fulfillment request, steps S1316 to S1338 can include processing the order including notifying a transporter that the order is ready, and steps S1340 and S1342 can include the transporter making a delivery of the order and completing the fulfillment of the order.

Prior to Step S1302, an end user can create a fulfillment request message for one or more items (e.g., food) from a service provider (e.g., restaurant) using an end user device. The end user device can provide the fulfillment request message to the central server computer. The central server computer can be operated by an entity that coordinates the delivery of orders from various service providers to end users.

At step S1302, upon receiving the fulfillment request message from the end user device, the delivery event bus 1318 of the central server computer can trigger the smart shelf service 1306 to create an order (e.g., delivery order) corresponding to the details of the fulfillment request. The delivery event bus 1318 can trigger actions based on events. For example, when the central server computer receives the fulfillment request message from the end user device, the delivery event bus 1318 can identify the event of receiving the fulfillment request message. The delivery event bus 1318 can provide a notify the smart shelf service 1306 of the fulfillment request message. The delivery event bus 1318 can provide the fulfillment request message to the smart shelf service 1306.

At step S1304, after receiving the fulfillment request message, the smart shelf service 1306 can generate an estimated weight request message. The estimated weight request message can be a request to receive estimated weight data that corresponds to the order indicated in the fulfillment request message. The smart shelf service 1306 can provide the estimated weight request message to the weight service 1308 to determine estimated weight data of the one or more items of the order of the fulfillment request message. In some embodiments, the smart shelf service 1306 can provide the fulfillment request message in the estimated weight request message to the weight service 1308. In other embodiments, the smart shelf service 1306 may not send the fulfillment request message to the weight service 1308, where the weight service 1308 looks up relevant information regarding the fulfillment request message.

At step S1306, the weight service 1308 can generate an information request message that requests information regarding the one or more items in the fulfillment request message. The weight service 1308 can provide the information request message to the merchant order service 1310. The information request message can be an API call to the merchant order service 1310, which returns the data related to the one or more items. For example, the merchant order service 1310 can provide names, item types (e.g., drink, side, main, etc.), selected options or sides, and/or any other information included in the fulfillment request message to the weight service 1308. Further, the merchant order service 1310 can provide item identifiers for each of the one or more items to the weight service 1308 in response to the information request message.

At step S1308, after receiving data relating to the one or more items, the weight service 1308 can retrieve historical weight data of each item from the weight database 1314. For example, the weight service 1308 can retrieve historical weight data for each item of the fulfillment request message from the weight database 1314 using the item identifiers for each item.

At step S1310, after receiving the historical weight data for each item, the weight service 1308 can determine estimated weight data for the order based on the received historical weight data. For example, the weight service 1308 can determine a total sum of each items historical weight data to obtain an estimated weight data for the order.

After determining the estimated weight data, the weight service 1308 can provide the estimated weight data to the smart shelf service 1306 in response to the estimated weight request message. In some embodiments, the weight service 1308 can also provide the individual estimated weight data for each item of the order based on the historical weight data to the smart shelf service 1306.

At step S1312, after receiving the estimated weight data, the smart shelf service 1306 can create a pending order to process by the service provider including the estimated weight data and data related to the fulfillment request (e.g., user information, total cost, etc.). The smart shelf service 1306 can provide the pending order to the smart shelf database 1312 for storage. The pending order can be stored in association with a service provider identifier that identifies the service provider that is to prepare the order.

At step S1314, the scale computer 1302 can check for pending orders by communicating with the smart shelf service 1306. The scale computer 1302 can check for pending orders at any point in time. The scale computer 1302 can check for pending orders at regular intervals (e.g., every minute) or can check for pending orders based on how many pending orders are currently known by the scale computer 1302. For example, if the scale computer 1302 has no current pending orders, the scale computer 1302 may check for new pending orders more frequently than if the scale computer 1302 has ten pending orders.

The scale computer 1302 can generate and provide a pending order request message to the smart shelf service 1306 to request any pending orders. The pending order request message can include the service provider identifier of the service provider that operates the scale computer 1302.

At step S1316, after receiving the pending order request message, the smart shelf service 1306 can query the smart shelf database 1312 for any pending orders using the service provider identifier.

At step S1318, the smart shelf service 1306 can provide any pending order(s), obtained from the smart shelf database 1312, to the scale computer 1302. In some embodiments, the smart shelf database 1312 can have a plurality of pending orders from a plurality of fulfillment requests and can provide the plurality of pending orders to the scale computer 1302.

At step S1320, after receiving one or more pending orders from the smart shelf service 1306, the scale computer 1302 can notify operator(s) of the scale computer 1302 that the one or more pending orders were received. The operator(s) of the scale computer 1302 can prepare one or more items for each pending order. When the one or more items for a pending order are complete, an operator can place a container comprising the one or more items for the pending order on the scale coupled to the scale computer 1302.

The scale can obtain actual weight data for the load (e.g., the container). The scale can provide the actual weight data to the scale computer 1302. The operator of the scale computer 1302 can select an order among the plurality of pending orders matching the one or more items on the scale. The scale computer 1302 can compare the actual weight data to the estimated weight data. For example, the scale computer 1302 can verify that the actual weight data corresponds to the estimated weight data. The scale computer 1302 can perform additional processing based on verifying. Various additional processing steps will be discussed.

In some embodiments, the scale computer 1302 can provide the actual weight data to the central server computer. The central server computer can verify that the actual weight data corresponds to the one or more items of the order. The central server computer can verify the actual weight data by comparing the actual weight data to the estimated weight data of the order. If the two weight data match, then the central server computer can perform additional processing of the order based on the weight data.

In some embodiments, additional processing can include adjusting the items in the order. For example, the estimated weight data and the measured weight data may differ beyond the certain weight threshold. In such case, the service provider may realize the fulfillment request of the one or more items is erroneous and replace the one or more items with a correct item(s).

In some embodiments, a camera coupled to the scale computer can aid in identifying the order from plurality of pending orders. Additional processing can include processing image data. For example, the camera can capture image data of the one or more items. The camera can output the image data to the scale computer 1302. The scale computer 1302 can determine which item belongs to an order using several different approaches.

A first approach can be when a new unidentified load (e.g., item) is detected, the scale computer 1302 can check if any orders have been identified by camera in the past (e.g., during certain amount of seconds), but have not yet had a weight associated with them. If there is a match, the scale can associate the new weight with that order.

A second approach can be when a new unidentified weight is detected with no matching order, the scale computer 1302 can prompt the operator of the scale computer using a UI to identify the order.

A third approach can be when an order is identified by camera, the scale computer 1302 can check if an unidentified weight was detected in the past. If an unidentified weight is found, the scale computer 1302 can associate unidentified weight with the identified order. Upon a successful match, the central server computer can perform additional processing of the order based on the weight data and the image data.

In some embodiments, the additional processing can include the scale computer 1302 providing the image data to the smart shelf service 1306 for storage in association with the fulfillment request identifier.

Additional processing can also include generating an order ready for pickup notification. For example, the scale computer 1302 can generate an order ready for pickup notification. In some embodiments, the central server computer can perform the additional processing and generate the order ready for pickup notification.

As an example, at step S1322, the scale computer 1302 can send the order ready for pickup notification, which can be an indication that the one or more items is ready to deliver, to the smart shelf service 1306. The order ready for pickup notification can include the fulfillment request identifier. The order ready for pickup notification can also include the service provider identifier.

At step S1324, after receiving the order ready for pickup notification, the smart shelf service 1306 can update the matching order in the smart shelf database 1312.

At step S1326, the smart shelf service 1306 can provide the order ready for pickup notification to the merchant order service 1310. The merchant order service 1310 can provide the order ready for pickup notification to one or more transporter user devices that are available to deliver the order from the service provider to the end user. A transport user device of a transporter of the one or more transporter user devices can send acceptance indication to deliver the order. In such case, the central server computer can facilitate the delivery of the order by the transporter.

In some embodiments, additional processing can include providing the order ready for pickup notification to a transporter device that is an autonomous vehicle (e.g., an autonomous car, autonomous drone, etc.).

In some embodiments, at step S1328, the smart shelf service 1306 can store image data of the order to the image database 1316. For example, the scale computer 1302 can provide the image data that includes an image of the order on the scale to the smart shelf service 1306. The smart shelf service 1306 can store the image data for later use (e.g., in conflict resolution as proof that the container including the order was on the scale at a particular point in time with a particular weight).

At step S1330, the smart shelf service 1306 can generate and send a response to the scale computer 1302 that the order has been processed to be delivered.

At a point later in time, at step S1332, the scale computer 1302 can obtain current actual weight data for the order on the scale. The scale computer 1302 can periodically obtain current actual weight data for orders on the scale. The scale computer 1302 can provide the current actual weight data of the order to the smart shelf service 1306. In some embodiments, if the estimated weight data and the actual weight data of the one or more items previously differed beyond the weight threshold, and the service provider selected that the one or more items are correct despite the weight discrepancy notification, then the central server computer may have inaccurate weight estimate of the one or more items.

At step S1334, the smart shelf service 1306 can store the current weight data in the smart shelf database 1312 in association with the fulfillment request identifier.

At step S1336, the smart shelf service 1306 can provide current actual weight data of the order to the weight service 1308. If the estimated weight data and the actual weight data of the one or more items previously differed beyond the weight threshold, as mentioned above, then the weight service 1308 can provide the current actual weight data to the weight database 1314 to update the estimated weight based on the measured weight.

In some embodiments, at step S1338, the smart shelf service 1306 can provide a response to the scale computer 1302 that the current actual weight has been stored.

At a point in time, the transporter can pick up the order from the scale. The delivery event bus 1318 can identify the pickup event in different ways.

In a first way, the transporter can utilize their transporter user device to push a button to indicate that the order is being picked up. The transporter user device can notify the central server computer of the pickup event. The delivery event bus 1318 can identify the pickup event.

In a second way, the transporter can utilize the scale computer 1302 to push a button to indicate that the order is being picked up. The scale computer 1302 can notify the central server computer (e.g., via the smart shelf service 1306) of the pickup event. The delivery event bus 1318 can identify the pickup event.

In a third way, the scale computer 1302 can obtain current actual weight data from the scale, which indicates a reduction in weight on the scale by an amount equal to the order. The scale computer 1302 can utilize the camera to confirm that the order is no longer present on the scale. The scale computer 1302 can notify the central server computer (e.g., via the smart shelf service 1306) of the pickup event. The delivery event bus 1318 can identify the pickup event.

At step S1340, after the delivery event bus 1318 identifies the pickup event, the delivery event bus 1318 can notify the smart shelf service 1306, if the pickup event did not originate through the smart shelf service 1306 (e.g., the pickup event came from the transporter user device) that the order has been picked up by the transporter.

At step S1342, the smart shelf service 1306 can update the order in the smart shelf database 1312 by changing the order status to "done" when the order gets picked up.

Figure 14:
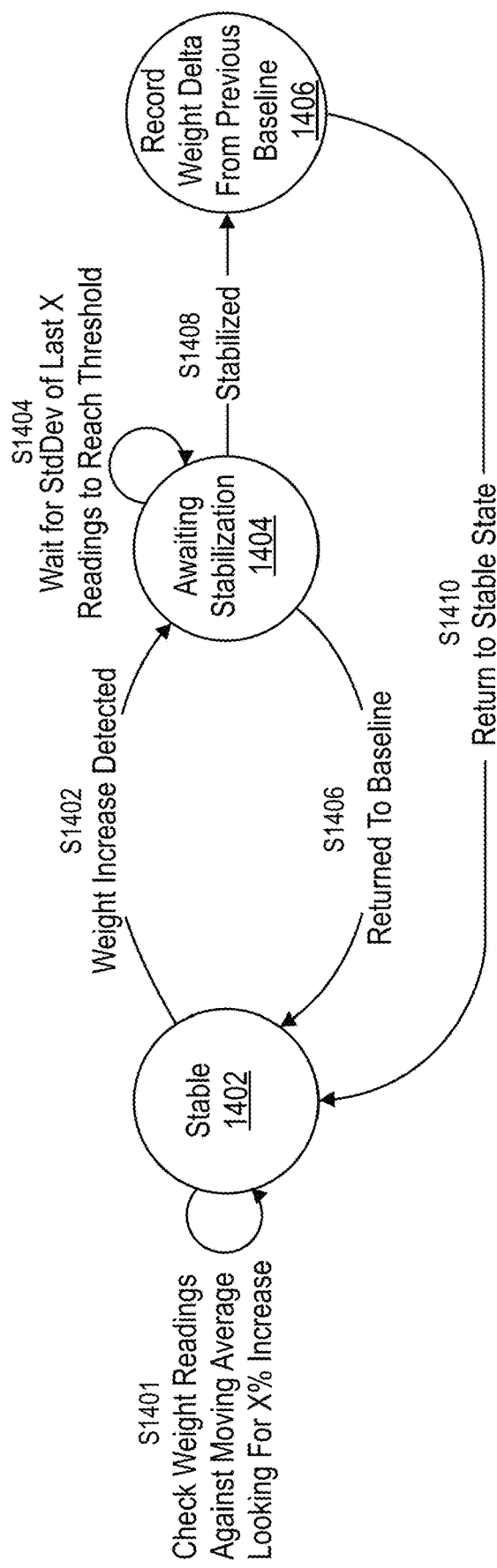
FIG. 14 shows a state diagram of detecting weight changes according to embodiments.

FIG. 14 shows a state diagram of detecting weight changes according to embodiments. Due to noise from environment (e.g., hand touching scale, breeze affecting weight, etc.), a moving average or other aggregation of weight reading may be needed to get an accurate weight measurement. The state diagram of a state machine in FIG. 14 can be used to manage the scale readings and attempt to detect when a new object is placed on the scale. There are three states in the state diagram: stable state 1402, awaiting stabilization state 1404, and record weight delta from previous baseline state 1406.

The stable state 1402 can be a state when the weight measurement is stable. The stable state 1402 can occur if no weight measurement change has been detected by the scale in a predetermined amount of time (e.g., 0.1 seconds, 2 seconds, etc.). The awaiting stabilization state 1404 can be a state where the scale is waiting for the weight to stabilize. The record weight delta from previous baseline state 1406 can be a state where the scale determines to record a weight change to capture actual weight data.

At state change S1401, the state stable 1402 can check weight readings against a moving weight average above certain percentage increase. The weight average may be moving due to external noise. For example, if an item of 10 lb is on the scale, the scale can check for a moving average looking for 10% increase. Therefore, even if some noise such as breeze accounts for increase of 0.5 lb, since 0.5 lb is less than 1 lb (10%), the scale would not shift weight and still remain in the stable state 1402.

At state change S1402, if there is a moving average above the certain percentage increase, the scale can shift from stable state 1402 to the awaiting stabilization state 1404.

At step S1406, if the moving average went over the certain percentage increase, but soon went back to baseline weight, then the awaiting stabilization state 1404 can shift back to the stable state 1402. For example, if an item of 10 lb is on the scale, the scale can check for a moving average looking for 10% increase. If some noise such as breeze accounts for increase of 1.5 lb, the stable state 1402 would shift to the awaiting stabilization state 1404. But since the breeze is unstable and stays for a brief moment, the scale would soon shift the state back to the state stable 1402 once the breeze disappears.

At state change S1404, after the weight increase is detected, if the weight increase stays and is stable, the scale can wait for standard deviation of last couple weight increase readings to reach the threshold. For example, if a new item of 5 lb is placed on the scale, the scale can take several measurements of the new item. The measurements of weight may fluctuate due to noise (e.g., 5.1 lb, 5.2 lb, etc.). For every new measurement, the scale can calculate a standard deviation for the 10 most recent readings. If the calculated standard deviation does not reach the threshold (such as 1 standard deviation), then the scale can take more measurements until the calculated standard deviation can meet the threshold.

In state change S1408, if the standard deviation meets the threshold, the scale can go from the awaiting stabilization state 1404 to the record weight delta from previous baseline state 1406. In the record weight delta from previous baseline state 1406, the scale can identify and record the difference in weight increase, which can be the actual weight data of the newly added load.

In state change S1410, the scale can go from the record weight delta from previous baseline state 1406 to the stable state 1402 with the difference in weight acting as a new baseline weight from which new measurements are recorded.

Embodiments provide for a number of advantages. For example, embodiments provide for a triggering event that indicates that an order is ready for pickup for delivery while verifying the accuracy of the weight of the order.

Embodiments provide for an advantage of verifying the weight of one or more items in an order even though the items are in a closed container and not easily identified by eye. The weight of the order can indicate whether or not all of the requested items are included in the closed container.

Embodiments further provide for an advantage of capturing weight data for conflict resolution in case of erroneous or fraudulent item placement in the order. For example, previously, when an order in a closed container is delivered to an end user, the end user has no recourse if an item is missing since no verification has occurred since the order was packaged. Therefore, the only parties with information regarding the items are the two parties in opposition in regards to remedying the order. Embodiments provide for recordation of order weights and/or images that can be utilized to aid in a remediation process.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a scale system comprising a computer and a scale from a central server computer over a communications network, a fulfillment request associated with one or more items to be delivered from a service provider preparing the one or more items to an end user by a transporter operating a transporter user device;
responsive to receiving the fulfillment request, determining, by the computer in the scale system, estimated weight data based on the one or more items in the fulfillment request;
obtaining, by the computer using the scale, actual weight data associated with the fulfillment request for one or more items, by weighing the one or more items using the scale coupled to the computer to determine the actual weight data;
verifying, by the computer, that the actual weight data corresponds to the estimated weight data; and
in response to verifying, that the actual weight data corresponds to the estimated weight data, automatically generating, by the computer, a first notification that the one or more items are completed by the service provider and are ready to deliver to the end user, and transmitting the first notification to the central server computer, wherein the central server computer transmits the first notification to the transporter user device of the transporter that is delivering the one or more items to the end user;
determining, by the computer, that a current weight detected by the computer using the scale is reduced by an amount equal to the one or more items;
responsive to determining that the current weight detected by the computer using the scale is reduced by the amount equal to the one or more items, automatically generating, by the computer, a second notification indicating that the transporter has retrieved the one or more items; and
transmitting, by the computer, the second notification to the central server computer, wherein the central server computer transmits an update message to an end user device of the end user based on the second notification, and stores the actual weight data corresponding to the estimated weight data, wherein the actual weight data is used by the central server computer to prove that an order for the one or more items was complete when the one or more items were obtained by the transporter from the service provider, and delivered to the end user.

2. The method of claim 1, wherein the central server computer is remotely located with respect to the service provider that fulfills the fulfillment request for the one or more items, and the fulfillment request is received from the end user device, and the one or more items are requested by the end user of the end user device.

3. The method of claim 2, wherein the method further comprises:
providing, by the central server computer, to one or more transporter user devices of one or more transporters, a communication regarding the fulfillment request;
receiving, by the central server computer, an acceptance indication from the transporter user device of the transporter; and
facilitating, by the central server computer, a delivery of the one or more items by the transporter from a service provider location of the service provider to the end user.

4. The method of claim 3, wherein the transmitting of the first notification to the transporter user device occurs at the same time that the communication is provided.

5. The method of claim 1, wherein the one or more items comprises two or more items in an order of items in a container, and determining the actual weight data comprises weighing the container comprising the two or more items using the scale coupled to the computer to determine the actual weight data.

6. The method of claim 5, wherein the container is a closed container.

7. The method of claim 6, wherein the container is a bag.

8. The method of claim 1, wherein the scale system is at a location of the service provider, the service provider being a restaurant.

9. The method of claim 8, wherein the one or more items are food items.

10. The method of claim 8, wherein the one or more items are food items and are placed on the scale when the food items are in a closed bag.

11. The method of claim 1, wherein the method further comprises determining if the actual weight data exceeds a weight threshold for delivery of the one or more items to the end user.

12. The method of claim 11, wherein the method further comprises:
   providing, by the central server computer to one or more transporter user devices of one or more transporters, a communication regarding the fulfillment request, wherein the transporters are autonomous vehicles and the one or more transporter user devices are communication devices in the autonomous vehicles;
   receiving, by the central server computer, an acceptance indication from the transporter user device of the transporter of the one or more transporter user devices; and
   facilitating, by the central server computer, delivery of the one or more items by the transporter from the service provider to the end user.

13. The method of claim 1, wherein the scale system is at a service provider location.

14. The method of claim 1, wherein the method further comprises determining if the fulfillment request of the one or more items provided by the service provider is erroneous or fraudulent.

15. The method of claim 1, wherein the one or more items comprises two or more items and constitutes the order, and the scale is in a form of a shelf, which is adapted to receive and support multiple orders in multiple containers.

16. The method of claim 1, further comprising:
   determining, by the central server computer, a first fulfillment request identifier for the fulfillment request;
   storing, by the central server computer, the first fulfillment request identifier in a database along with indications of the one or more items and the estimated weight data,
   receiving, by the central server computer, a second fulfillment request identifier associated with the actual weight data; and
   looking up the estimated weight data in the database using the second fulfillment request identifier to determine a match with the first fulfillment request identifier.

17. The method of claim 1, wherein the scale system further comprises a display, and wherein the method further comprises:
   displaying a message on the display indicating that that the actual weight data is less than the estimated weight data and indicating different reasons why the actual weight data is less than the estimated weight data.

18. A system comprising:
   a central server computer; and
   a scale system comprising
   a scale, and
   a computer coupled to the scale, the computer comprising a processor, and
   a computer readable medium comprising code, executable by the processor, to perform a method comprising
   receiving, from the central server computer over a communications network, a fulfillment request associated with one or more items to be delivered from a service provider preparing the one or more items to an end user by a transporter operating a transporter user device,
   responsive to receiving the fulfillment request, determining estimated weight data based on the one or more items in the fulfillment request,
   obtaining actual weight data associated with the fulfillment request for one or more items, the actual weight data obtained using the scale,
   verifying that the actual weight data corresponds to the estimated weight data,
   in response to verifying that the actual weight data corresponds to the estimated weight data, automatically generating a first notification that the one or more items are completed by the service provider and are ready to deliver to the end user, and transmitting the first notification to the central server computer, wherein the central server computer transmits the first notification to the transporter user device of the transporter that is delivering the one or more items to the end user,
   determining that a current weight detected by the computer using the scale is reduced by an amount equal to the one or more items,
   responsive to determining that the current weight detected by the computer using the scale is reduced by the amount equal to the one or more items, automatically generating a second notification indicating that the transporter has retrieved the one or more items, and
   transmitting the second notification to the central server computer, wherein the central server computer transmits an update message to an end user device of the end user based on the second notification, and stores the actual weight data corresponding to the estimated weight data, wherein the actual weight data is used by the central server computer to prove that an order for the one or more items was complete when the one or more items were obtained by the transporter from the service provider, and delivered to the end user.

19. The system of claim 18, further comprising a camera operatively coupled to the computer, wherein the camera is adapted to capture image data of the one or more items on the scale.

20. The system of claim 18, further comprising:
   a container with the one or more items, the container with one or more orders being on the scale.

* * * * *